United States Patent
Gill et al.

(10) Patent No.: US 11,703,135 B2
(45) Date of Patent: Jul. 18, 2023

(54) MULTI-PORT COOLANT FLOW CONTROL VALVE ASSEMBLY

(71) Applicant: Vitesco Technologies USA, LLC, Auburn Hills, MI (US)

(72) Inventors: Ravinder Singh Gill, Chatham (CA); Alexander Dragojlov, Chatham (CA); Jeremy Daniel Schmidt, Chatham (CA); Benjamin MacNally, Chatham (CA)

(73) Assignee: VITESCO TECHNOLOGIES USA, LLC, Auburn Hills, MI (US)

( * ) Notice: Subject to any disclaimer, the term of this patent is extended or adjusted under 35 U.S.C. 154(b) by 0 days.

(21) Appl. No.: 17/457,535

(22) Filed: Dec. 3, 2021

(65) Prior Publication Data

US 2023/0175599 A1    Jun. 8, 2023

(51) Int. Cl.
*F16K 11/08* (2006.01)
*F16K 11/085* (2006.01)

(52) U.S. Cl.
CPC .............................. *F16K 11/0856* (2013.01)

(58) Field of Classification Search
CPC .................................................. F16K 11/0856
See application file for complete search history.

(56) References Cited

U.S. PATENT DOCUMENTS

| | | | |
|---|---|---|---|
| 668,833 A | 2/1901 | Gilbert | |
| 3,499,467 A | 3/1970 | Mccord | |
| 3,630,231 A | 12/1971 | Miller | |
| 3,692,041 A * | 9/1972 | Bondi | F02C 7/22 |
| | | | 416/157 R |
| 3,927,693 A | 12/1975 | Johnston | |
| 4,108,207 A | 8/1978 | Doody | |
| 5,967,185 A | 10/1999 | Baruschke et al. | |
| 6,295,828 B1 | 10/2001 | Koo | |
| 6,539,899 B1 | 4/2003 | Piccirilli et al. | |
| 8,740,186 B2 | 6/2014 | Lauridsen | |
| 9,212,751 B2 | 12/2015 | McLane et al. | |
| 9,381,921 B2 | 7/2016 | Roudeau et al. | |
| 9,382,833 B2 | 7/2016 | Morein | |
| 9,383,032 B1 | 7/2016 | Bhatasana | |
| 9,404,594 B2 | 8/2016 | Morein | |

(Continued)

FOREIGN PATENT DOCUMENTS

| CN | 2093285 U | 1/1992 |
|---|---|---|
| CN | 2198478 Y | 5/1995 |

(Continued)

*Primary Examiner* — Kevin R Barss

(57) ABSTRACT

A multi-port valve assembly, which includes a housing, a plurality of ports formed as part of the housing, a rotor disposed in the housing, and is selectively in fluid communication with the plurality of ports. Also included is a plurality of channels integrally formed as part of the rotor, a central plane extending through the rotor, a first level on one side of the central plane where a portion of the channels is located on the first level, and a second level on the opposite side of the central plane in relation to the first level, where a portion of the channels are located on the second level. At least two flow paths are formed by the orientation of the rotor relative to the housing and the ports, and the rotor is placed in one of a plurality of configurations to achieve the at least two flow paths.

19 Claims, 23 Drawing Sheets

(56) References Cited

U.S. PATENT DOCUMENTS

| | | | |
|---|---|---|---|
| 9,500,299 B2 | 11/2016 | Morein et al. | |
| 9,958,082 B2 | 5/2018 | Yu et al. | |
| 10,344,877 B2 | 7/2019 | Roche et al. | |
| 10,458,562 B2* | 10/2019 | Ozeki | F16K 31/041 |
| 10,544,725 B2 | 1/2020 | Schaefer | |
| 10,690,040 B2 | 6/2020 | Jang et al. | |
| 10,704,453 B2 | 7/2020 | Park et al. | |
| 10,808,856 B2* | 10/2020 | Shen | F01P 3/20 |
| 10,927,972 B2 | 2/2021 | Murakami | |
| 10,968,809 B2 | 4/2021 | Yoshimura et al. | |
| 10,968,810 B2 | 4/2021 | Zhou et al. | |
| 11,454,330 B1* | 9/2022 | Gray | F16K 11/0856 |
| 2003/0098077 A1* | 5/2003 | McLane | F16K 11/0856 137/625.47 |
| 2006/0237359 A1 | 10/2006 | Lin et al. | |
| 2007/0044856 A1* | 3/2007 | Bonior | F16K 11/0856 137/625.47 |
| 2010/0319796 A1 | 12/2010 | Whitaker | |
| 2013/0263949 A1* | 10/2013 | Bartnick | F16K 11/0856 137/625 |
| 2015/0354716 A1 | 12/2015 | Morein | |
| 2017/0152957 A1 | 6/2017 | Roche et al. | |
| 2018/0080664 A1 | 3/2018 | Paola | |
| 2018/0094735 A1 | 4/2018 | Clement | |
| 2018/0292016 A1 | 10/2018 | Ledvora et al. | |
| 2019/0136724 A1 | 5/2019 | Wong | |

FOREIGN PATENT DOCUMENTS

| | | |
|---|---|---|
| CN | 201502748 U | 6/2010 |
| CN | 201944338 U | 8/2011 |
| CN | 204729668 U | 10/2015 |
| CN | 105408671 A | 3/2016 |
| CN | 205401824 U | 7/2016 |
| CN | 107690543 A1 | 2/2018 |
| CN | 107917246 A1 | 4/2018 |
| CN | 108692066 A | 10/2018 |
| DE | 19707534 A1 | 5/1998 |
| EP | 0048680 A1 | 3/1982 |
| EP | 290514 A1 | 11/1988 |
| EP | 1448877 A1 | 8/2004 |
| EP | 3385583 A1 | 10/2018 |
| FR | 2988459 A1 | 9/2013 |
| JP | H246039 A1 | 2/1990 |
| JP | H828725 A1 | 2/1996 |
| WO | 2003046342 A1 | 6/2003 |
| WO | 20142014052571 A1 | 4/2014 |
| WO | 2015004497 A1 | 1/2015 |

* cited by examiner

MULTI-PORT COOLANT FLOW CONTROL VALVE ASSEMBLY

CROSS-REFERENCE TO RELATED APPLICATIONS

This application claims the benefit of provisional application 63/224,029, filed Jul. 21, 2021. The disclosure of the above application is incorporated herein by reference.

FIELD OF THE INVENTION

The invention relates generally to a multi-port coolant flow control valve assembly which includes a rotor having various channels which are used to configure the multi-port valve assembly to have various flow paths between multiple ports.

BACKGROUND OF THE INVENTION

Multi-port valves for directing fluid through various conduits are generally known. Some of the more common types of valve are a three-port valve and a four-port valve, where a single valve member is used to direct fluid from an inlet port to one of several outlet ports. Some multi-port valves include a five-port configuration, where a single actuator or multiple actuators are used to change the configuration of the valve to direct the flow of fluid as desired. However, these valves are expensive, and complex and costly to manufacture. Some existing designs offer little to no flexibility to accommodate multiple flow modes and multiple flow paths, or require multiple valves and actuators to function properly.

Accordingly, there exists a need for a multi-port valve assembly which is able to direct flow from an inlet port to multiple outlet ports, which is less complex and is less costly to manufacture.

SUMMARY OF THE INVENTION

In an embodiment, the present invention is a coolant flow control valve (CFCV) which includes an actuator which is used to rotate a rotor to one or more positions, and thus direct coolant (passing through the rotor) between ports. The rotor is rotated to different positions to create various flow paths, such that coolant is directed between the different flow paths.

In an embodiment, the present invention is a multi-level rotor which accommodates an increased number of inlet ports, outlet ports, and flow channels using a single rotor located in a housing, enabling a larger number of flow configurations.

In an embodiment, the housing includes seven ports which may function as an inlet or an outlet, which achieve different flow configurations.

For thermal management systems, reduced packaging cost is achieved by a reduced number of valves (e.g. a single 7-6 valve replaces two 5-3 valves or a combination of 5-3 and 4-2 valves and an extra independent flow path).

In an embodiment, the present invention includes a multi-level flow routing rotor which enables different flow configurations at each level, depending on the degree of rotation. The channels at different levels are sealed from each other within the housing allowing multiple flow configurations. The flow channels are manufactured into a single entity and thus always have same positional accuracy relative to each other when the rotor is moving. At different rotational angles of the rotor, flow channels at each level flow into/out of different mating ports.

In an embodiment, the present invention is a multi-port coolant flow control valve assembly, which includes a housing, a plurality of ports, each of the plurality of ports formed as part of the housing, and a rotor disposed in the housing. In an embodiment, the present invention also includes a plurality of channels integrally formed as part of the rotor, each of the plurality of channels selectively in fluid communication with one or more of the plurality of ports. In an embodiment, the present invention also includes a central plane extending through the rotor, a first level on one side of the central plane, where a portion of the plurality of channels is integrally formed as a part of the rotor which is located on the first level, and a second level on the opposite side of the central plane in relation to the first level, where a portion of the plurality of channels is integrally formed as a part of the rotor which is located on the second level. In an embodiment, the present invention also includes at least two flow paths formed by the orientation of the rotor relative to the housing and the plurality of ports, and the rotor is placed in one of a plurality of configurations to achieve the at least two flow paths.

In an embodiment, the plurality of channels include a first arcuate channel integrally formed as part of the rotor, where a portion of the first arcuate channel is located on the first level, and a portion of the first arcuate channel is located on the second level, and a second arcuate channel integrally formed as part of the rotor, where a portion of the second arcuate channel is located on the first level, and a portion of the second arcuate channel located on the second level. In an embodiment, the plurality of channels also include at least one side channel integrally formed as part of the rotor, and a central channel integrally formed as part of the rotor, where the central channel is in fluid communication with the side channel. The rotor is rotated relative to the housing such that one of the at least two flow paths includes one of the first arcuate channel, the second arcuate channel, or the side channel.

In an embodiment, the first arcuate channel is fluidically isolated from the second arcuate channel and the side channel, and the second arcuate channel is fluidically isolated from the side channel.

In an embodiment, the side channel includes a shallow recess portion, and an elongated channel in fluid communication the shallow recess portion. The elongated channel is in fluid communication with the central channel.

In an embodiment, the shallow recess portion is located on the first level and the elongated channel is located on the second level. In another embodiment, the shallow recess portion is located on the second level and the elongated channel is located on the first level. In an embodiment, a portion of the central channel located on the first level, and a portion of the central channel located on the second level.

In an embodiment, the channels include a first scallop channel integrally formed as part of the rotor, where a portion of the first scallop channel is located on the first level, and a portion of the first scallop channel is located on the second level, and a second scallop channel integrally formed as part of the rotor, where a portion of the second scallop channel is located on the first level, and a portion of the second scallop channel is located on the second level. In an embodiment, at least one side channel is integrally formed as part of the rotor, and a central channel is integrally formed as part of the rotor, where the central channel is in fluid communication with the side channel. In an embodiment, the rotor is rotated relative to the housing such that one of the two flow paths includes one of the first scallop channel, the second scallop channel, or the side channel.

In an embodiment, the first scallop channel is fluidically isolated from the second scallop channel and the side channel, and the second scallop channel is also fluidically isolated from the side channel. In an embodiment, a portion of the central channel is located on the first level, and a portion of the central channel located on the second level. In an embodiment, at least one of the at least two flow paths facilitates flow between the first level and the second level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
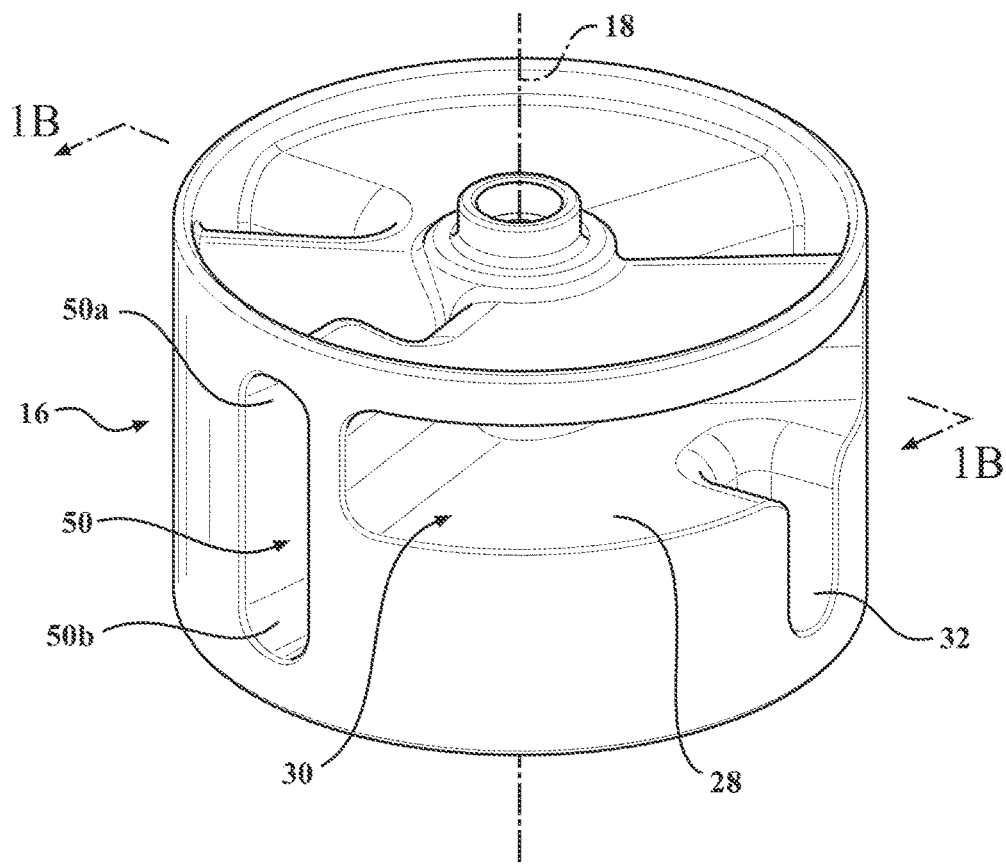
FIG. 1A is a first perspective view of a rotor used as part of a first embodiment of a multi-port valve assembly, according to embodiments of the present invention.
Figure 1B:
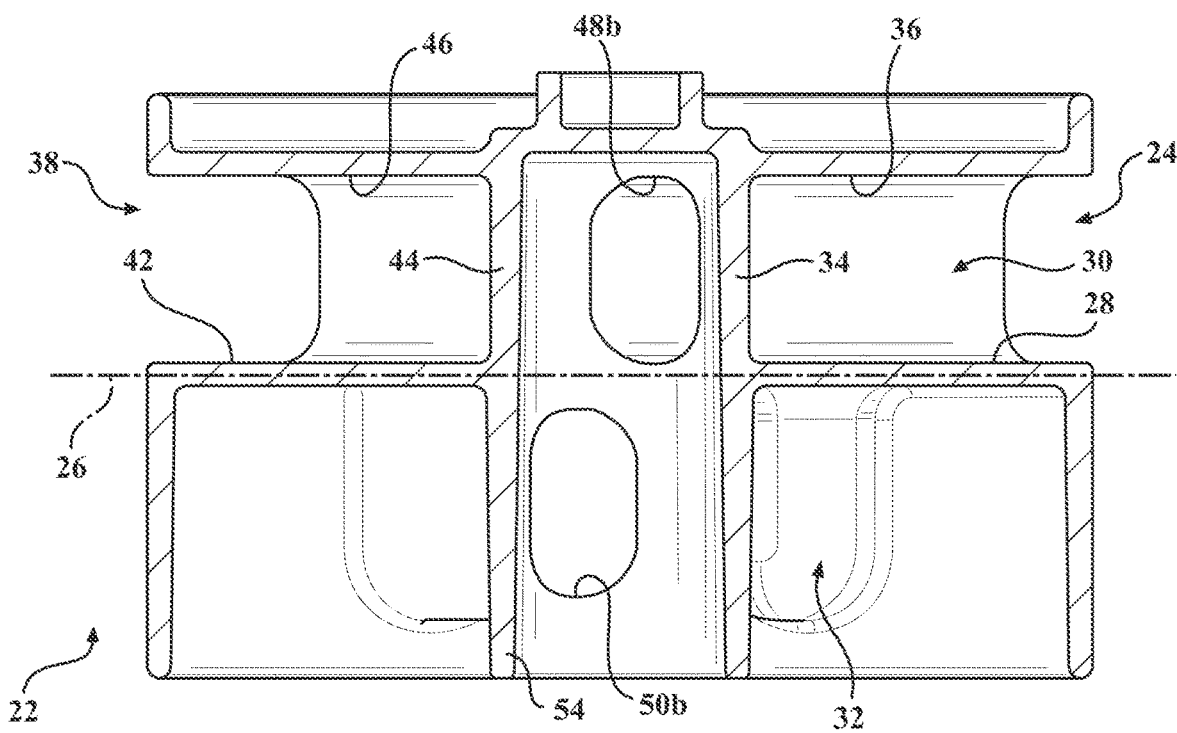
FIG. 1B is a sectional view taken along lines 1B-1B in FIG. 1A.
Figure 1C:
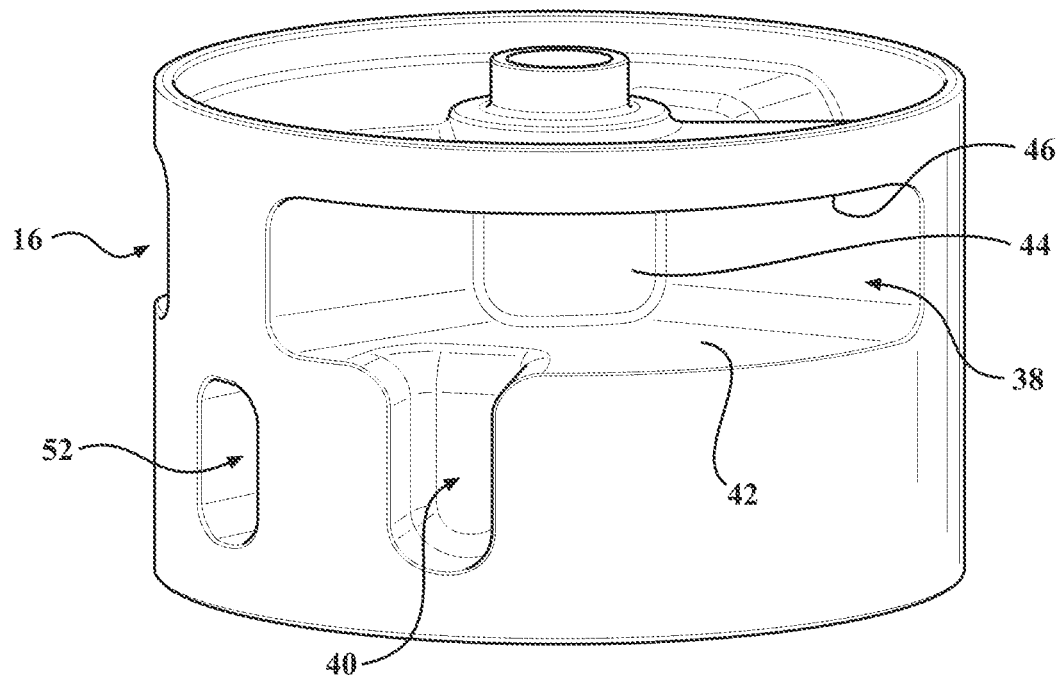
FIG. 1C is a second perspective view of a rotor used as part of a first embodiment of a multi-port valve assembly, according to embodiments of the present invention.
Figure 1D:
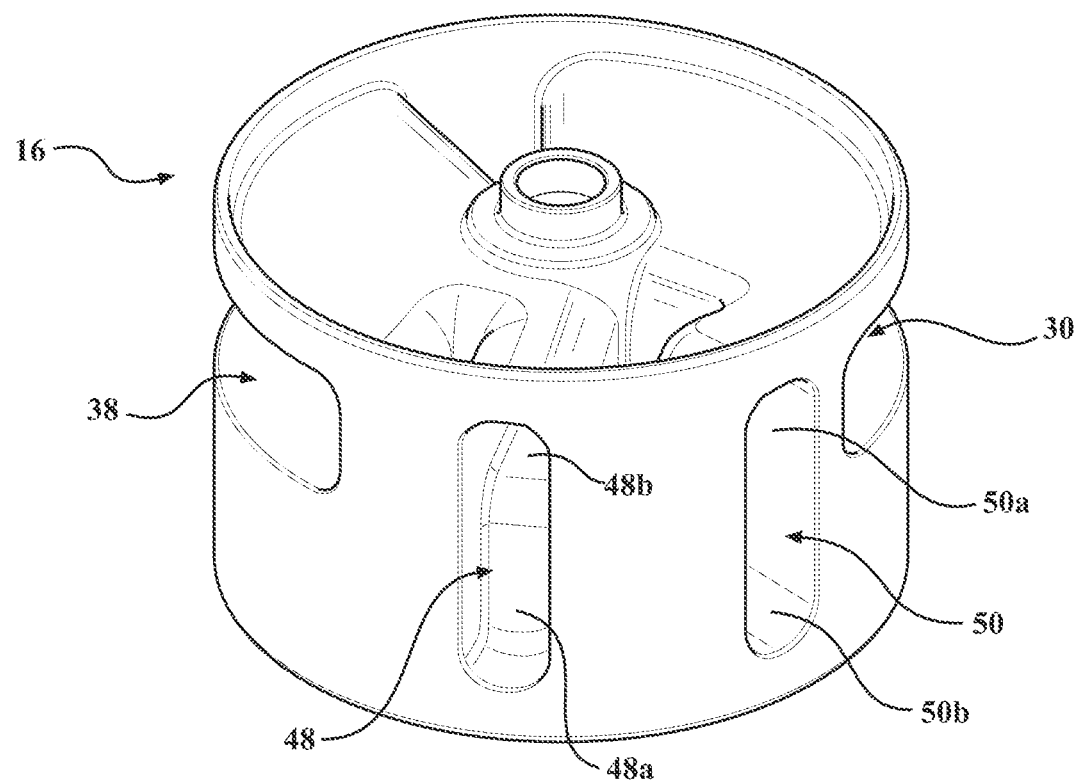
FIG. 1D is a third perspective view of a rotor used as part of a first embodiment of a multi-port valve assembly, according to embodiments of the present invention.
Figure 1E:
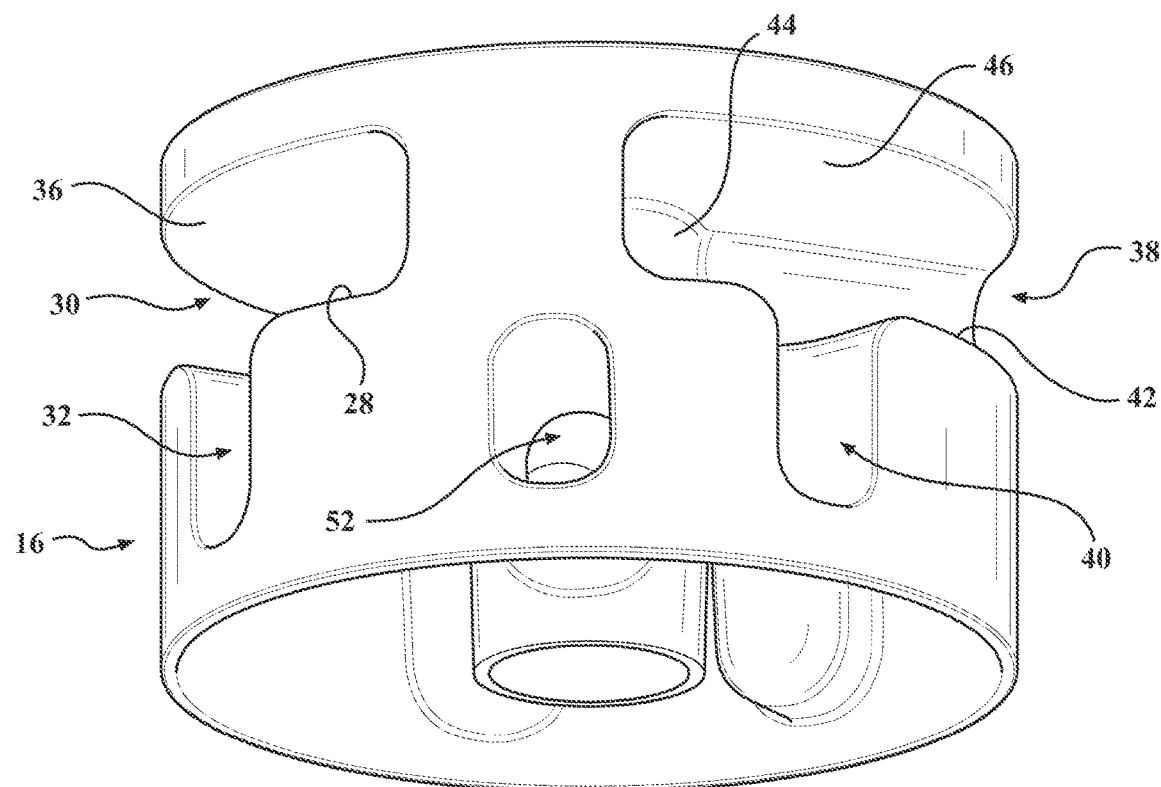
FIG. 1E is a fourth perspective view of a rotor used as part of a first embodiment of a multi-port valve assembly, according to embodiments of the present invention.
Figure 1F:
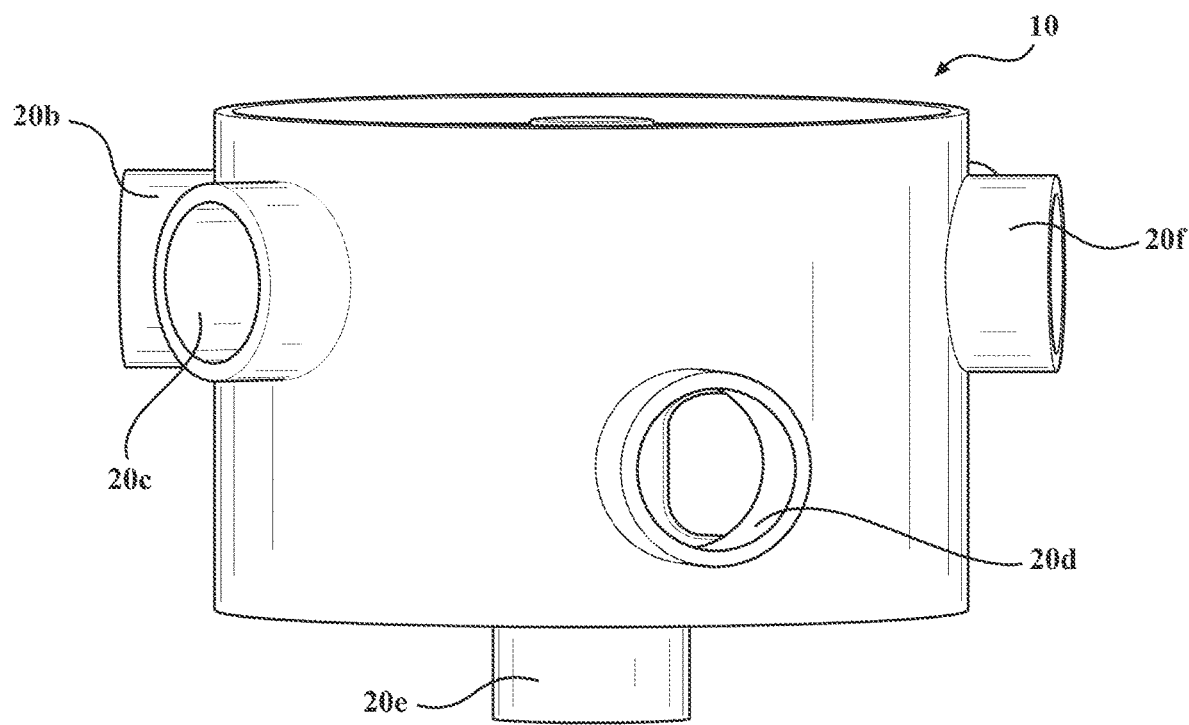
FIG. 1F is a first perspective view of a first embodiment of a multi-port valve assembly, according to embodiments of the present invention.
Figure 1G:
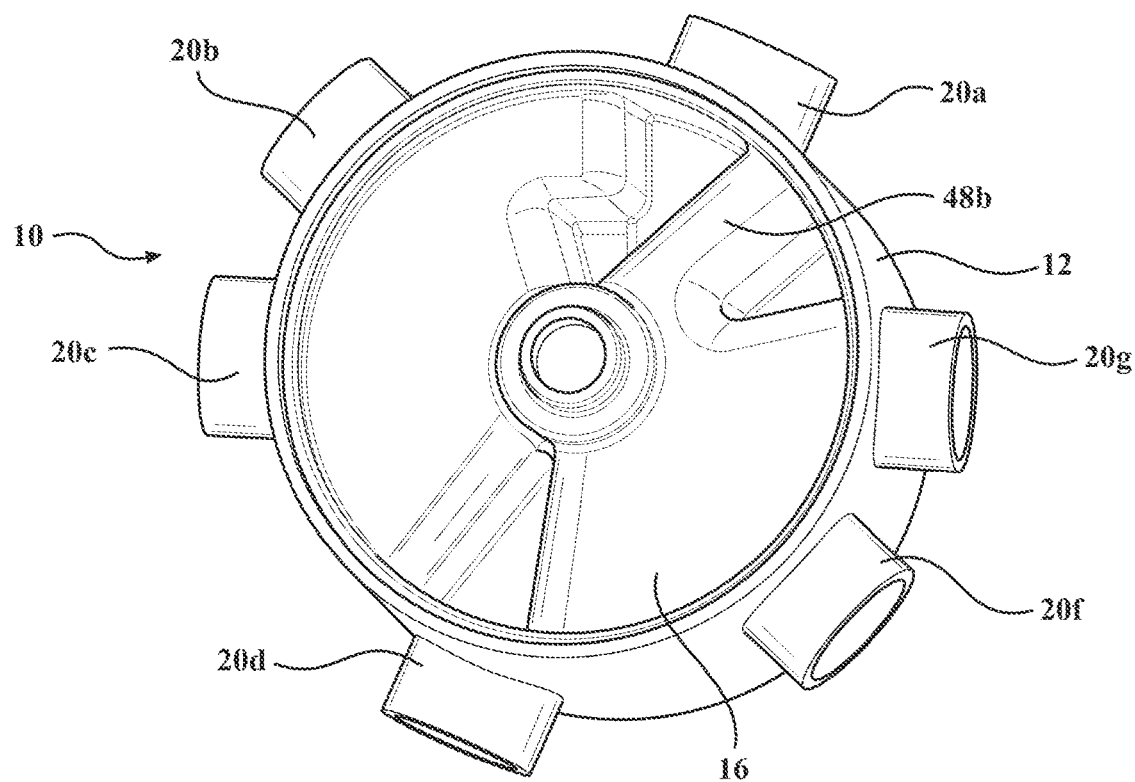
FIG. 1G is a second perspective view of a first embodiment of a multi-port valve assembly, according to embodiments of the present invention.

The following description of the preferred embodiment(s) is merely exemplary in nature and is in no way intended to limit the invention, its application, or uses.

A first embodiment of a coolant flow control valve assembly according to the present invention in shown in FIGS. 1A-7B generally at 10. The valve assembly 10 includes a housing 12, and inside the housing 12 is a cavity, shown generally at 14. Located in the cavity 14 is a valve member, which in this embodiment is a rotor, shown generally at 16. The rotor 16 is generally cylindrical in shape. The rotor 16 is able to rotate about an axis 18. In an embodiment, the rotor 16 is connected to a gear train, which is driven by an electric motor to rotate the rotor in the housing 12, but it is within the scope of the invention that the rotor 16 may be rotated using other devices.

The housing 12 includes several ports 20a,20b,20c,20d, 20e,20g,20f. The ports 20a,20b,20c,20d,20e,20g,20f are in selective fluid communication with various channels integrally formed as part of the rotor 16. The rotor 16 has channels which distribute fluid between two levels, a first level, shown generally at 22, and a second level, shown generally at 24. The levels 22,24 are separated by a central plane 26, where the first level 22 is on one side of the central plane 26, and the second level 24 is on the opposite side of the central plane 26 as the first level 22. A portion of the ports 20a,20d,20e are on one side of the central plane 26 on the first level 22, and another portion of the ports 20b,20c, 20f,20g is located on the opposite side of the central plane 26 on the second level 24.

Integrally formed as part of the rotor 16 is a first arcuate channel, shown generally at 30, and a first recess portion, shown generally at 32, where the first recess portion 32 is in fluid communication with the first arcuate channel 30. A first central wall portion 28 is formed as part of the first arcuate channel 30, and the first central wall portion 28 is located in the central plane 26. The first arcuate channel 30 also includes a first side wall 34, and an outer wall 36. The first arcuate channel 30 is located on the second level 24, and the first recess portion 32 is located on the first level 22, such that when the rotor 16 is placed in one of a plurality of configurations, the fluid is able to flow between the first level 22 and the second level 24.

Also integrally formed as part of the rotor 16 is a second arcuate channel, shown generally at 38, and a second recess portion, shown generally at 40, where the second recess portion 40 is in fluid communication with the second arcuate channel 38. A second central wall portion 42 is formed as part of the second arcuate channel 38, and the second central wall portion 42 is located in the central plane 26. The second arcuate channel 38 also includes a second side wall 44, and a second outer wall 46. The second arcuate channel 38 is located on the second level 24, and the second recess portion 40 is located on the first level 22, such that when the rotor 16 is placed in one of a plurality of configurations, the fluid is able to flow between the first level 22 and the second level 24.

Both the first arcuate channel 30 second arcuate channel 38 are located on the circumference of and extend into the rotor 16. Additionally, the first arcuate channel 30 second arcuate channel 38 do not intersect with the axis 18 of the rotor 16.

The rotor 16 also includes a first side channel, shown generally at 48, a second side channel, shown generally at 50, and a third side channel, shown generally at 52. The first side channel 48 is substantially oval in shape and includes a first shallow recess portion 48a and a first elongated channel 48b, which are in fluid communication with each other. The first elongated channel 48b is in fluid communication with a central channel 54. The first shallow recess portion 48a is located on the first level 22 and the first elongated channel 48b is located on the second level 24, such that when the rotor 16 is placed in one of a plurality of configurations, the fluid is able to flow between the first level 22 and the second level 24.

The second side channel 50 is also substantially oval in shape, and includes a second shallow recess portion 50a and a second elongated channel 50b, which are in fluid communication with each other. The second elongated channel 50b is in fluid communication with the central channel 54. The second shallow recess portion 50a is located on the second level 24, and the second elongated channel 50b is located on the first level 22, such that when the rotor 16 is placed in one of a plurality of configurations, the fluid is able to flow between the first level 22 and the second level 24.

The third side channel 52 is also in fluid communication with the central channel 54, and is located on the first level 22. Because the first side channel 48, the second side channel 50, and the third side channel 52 are all in fluid communication with the central channel 54, the first side channel 48, the second side channel 50, and the third side channel 52 are all in fluid communication with each other. The first arcuate channel 30 is fluidically isolated from the second arcuate channel 38 and the side channels 48,50,52. The second arcuate channel 38 is also fluidically isolated from the side channels 48,50,52.

Figure 1H:
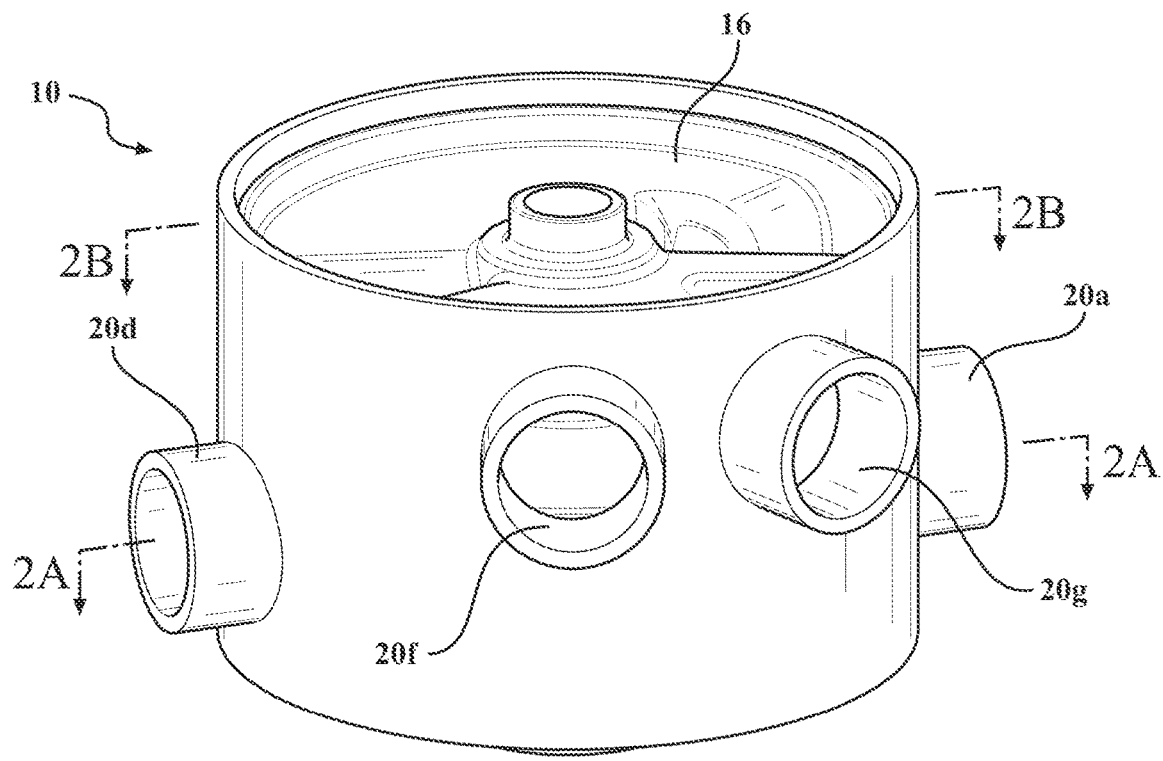
FIG. 1H is a third perspective view of a first embodiment of a multi-port valve assembly, according to embodiments of the present invention.
Figure 2A:
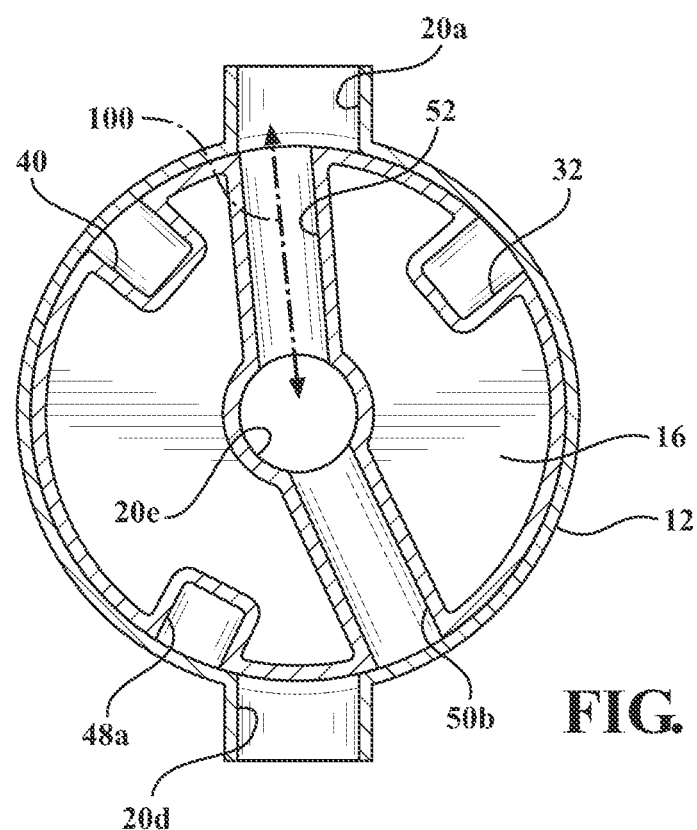
FIG. 2A is a first sectional view of a first embodiment of a multi-port valve assembly taken along lines 2A-2A in FIG. 1H, with the rotor in a first configuration, according to embodiments of the present invention.

Various configurations of the rotor 16 relative to the housing 12 are shown in FIGS. 2A-7B, which achieve various flow configurations. FIG. 2A is a sectional view taken along lines 2A-2A in FIG. 1H, and FIG. 2B is a sectional view taken along lines 2B-2B in FIG. 1H. FIGS. 3A-7B are similar sectional views, with the rotor 16 in different configurations.

Figure 2B:
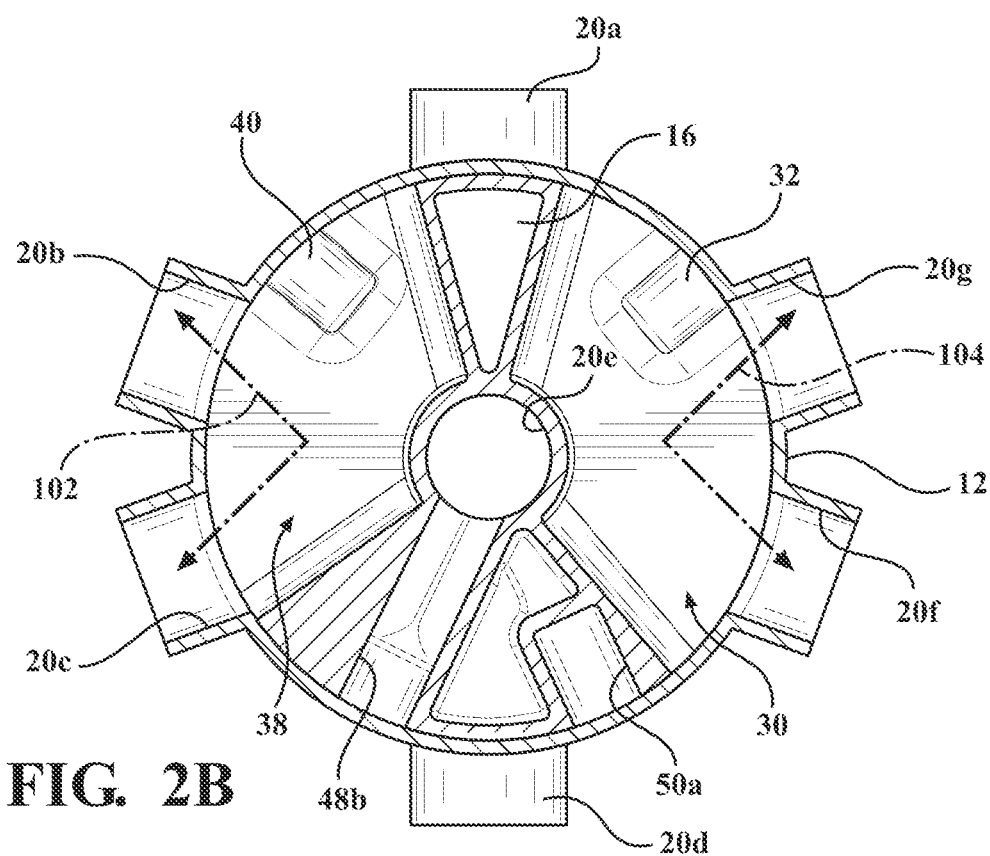
FIG. 2B is a second sectional view of a first embodiment of a multi-port valve assembly taken along lines 2B-2B in FIG. 1H, with the rotor in a first configuration, according to embodiments of the present invention.

Referring to FIGS. 2A and 2B, the rotor 16 is placed in a first configuration, where port 20e is in fluid communication with port 20a through the third side channel 52 to create a first flow path 100. When the rotor 16 is in the first configuration, the port 20b is in fluid communication with the port 20c through the second arcuate channel 38 to create a second flow path 102, and the port 20f in in fluid communication with the port 20g through the first arcuate channel 30 to create a third flow path 104. There is no fluid that passes through the side channels 48,50 or the port 20d.

Figure 3A:
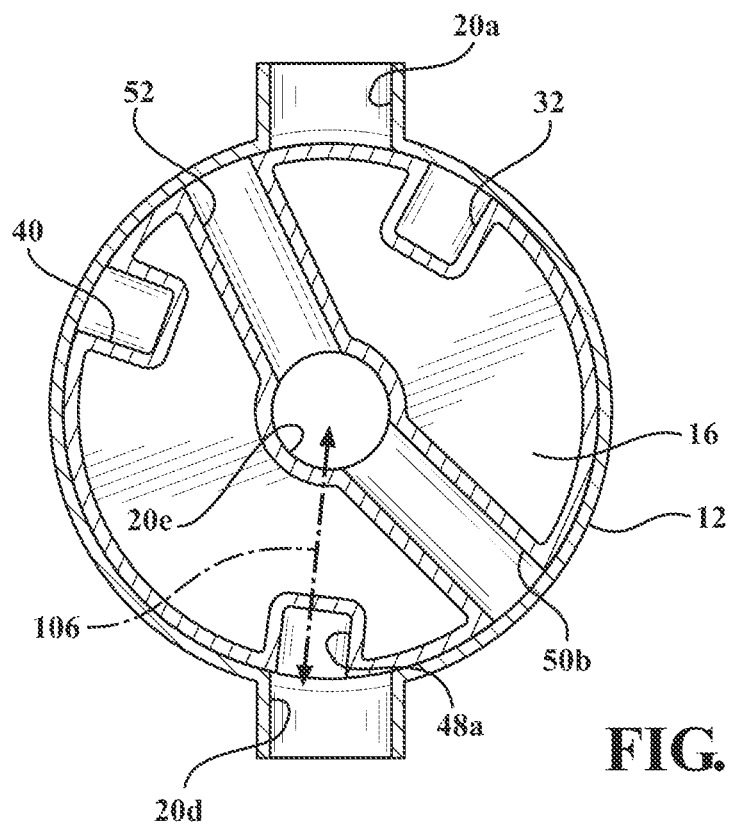
FIG. 3A is a first sectional view of a first embodiment of a multi-port valve assembly, with the rotor in a second configuration, according to embodiments of the present invention.
Figure 3B:
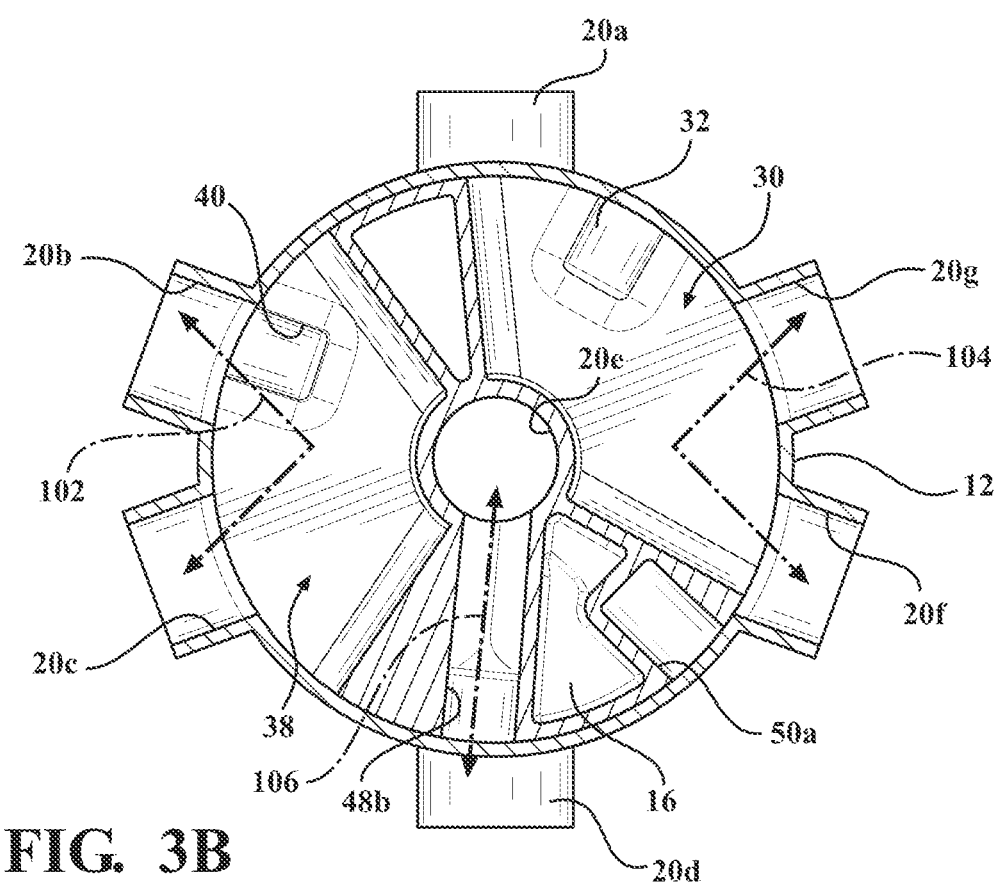
FIG. 3B is a second sectional view of a first embodiment of a multi-port valve assembly, with the rotor in a second configuration, according to embodiments of the present invention.

Referring to FIGS. 3A and 3B, the rotor 16 is placed in a second configuration, and the second configuration includes the second flow path 102 and the third flow path 104. When the rotor 16 is in the second configuration, the port 20d is in fluid communication with the port 20e through the first side channel 48, creating a fourth flow path 106. There is no fluid that passes through the side channels 50,52 or the port 20a.

Figure 4A:
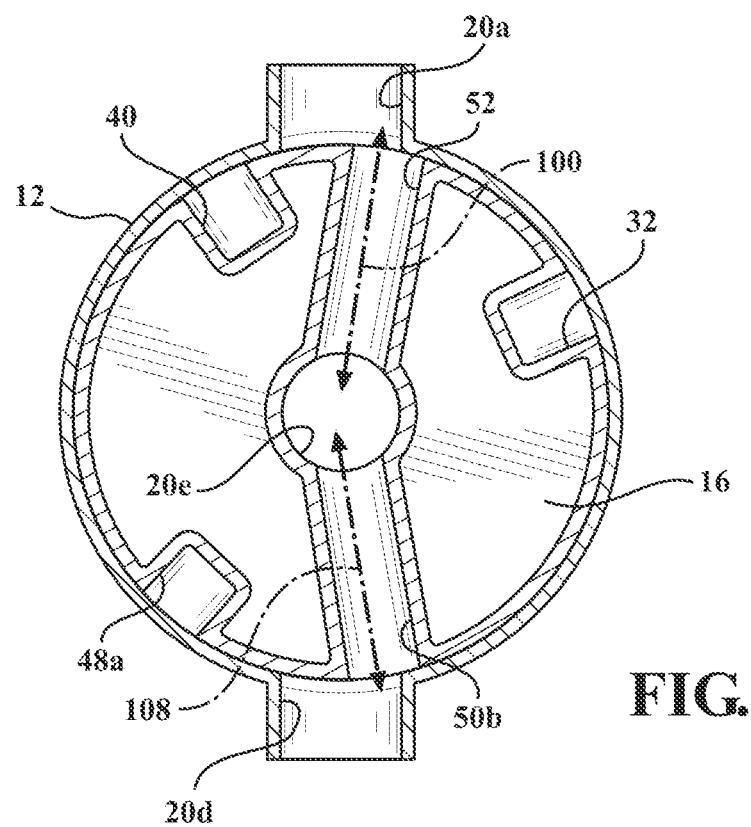
FIG. 4A is a first sectional view of a first embodiment of a multi-port valve assembly, with the rotor in a third configuration, according to embodiments of the present invention.
Figure 4B:
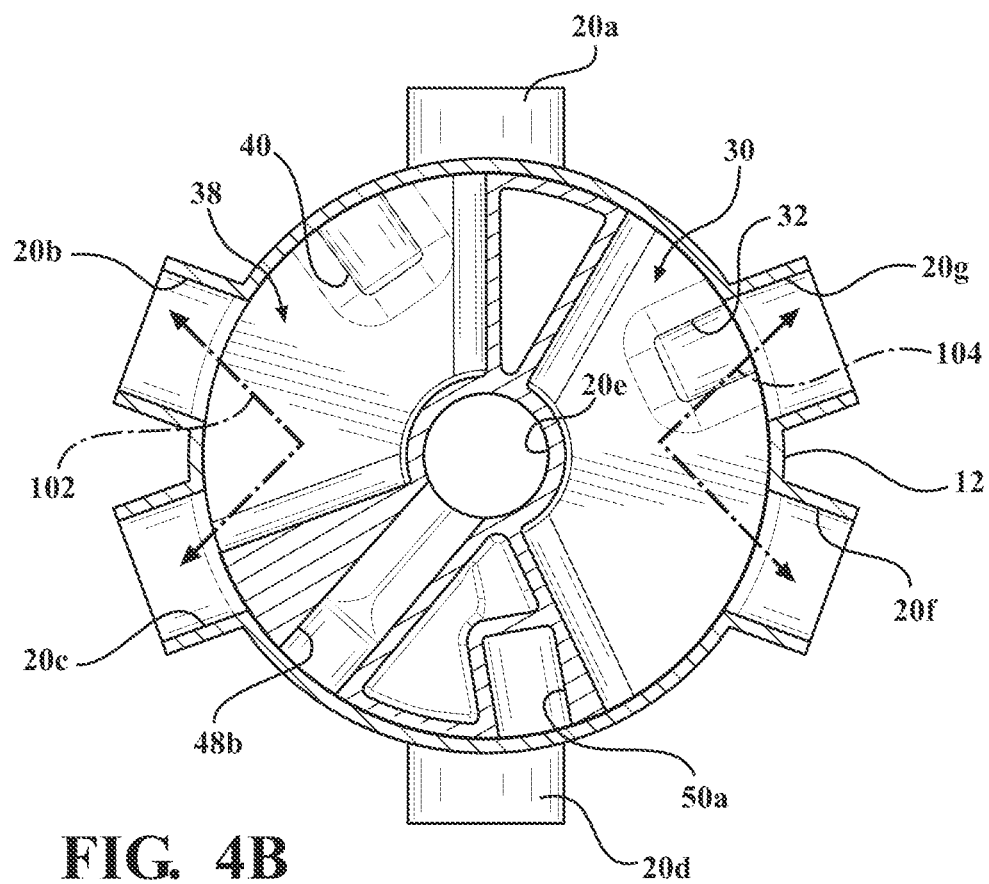
FIG. 4B is a second sectional view of a first embodiment of a multi-port valve assembly, with the rotor in a third configuration, according to embodiments of the present invention.

Referring to FIGS. 4A and 4B, the rotor 16 is placed in a third configuration, and the third configuration includes the first flow path 100, the second flow path 102, and the third flow path 104. When the rotor 16 is in the third configuration, the port 20e is also in fluid communication with the port 20d through the second side channel 50, creating a fifth flow path 108. There is no fluid that passes through the first side channel 48 when the rotor 16 is in the third configuration.

Figure 5A:
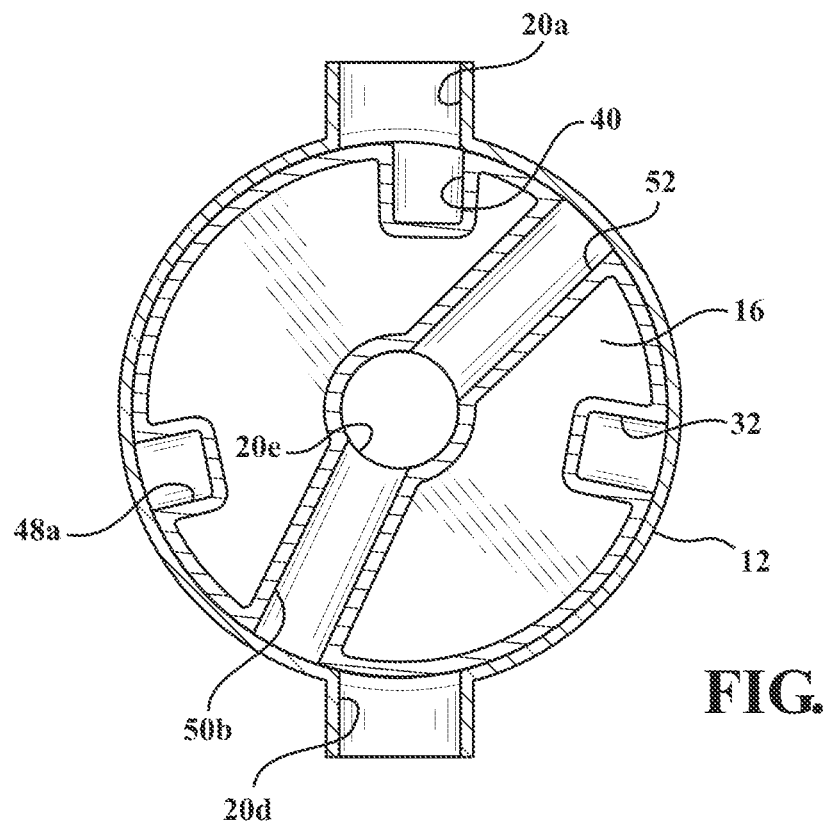
FIG. 5A is a first sectional view of a first embodiment of a multi-port valve assembly, with the rotor in a fourth configuration, according to embodiments of the present invention.
Figure 5B:
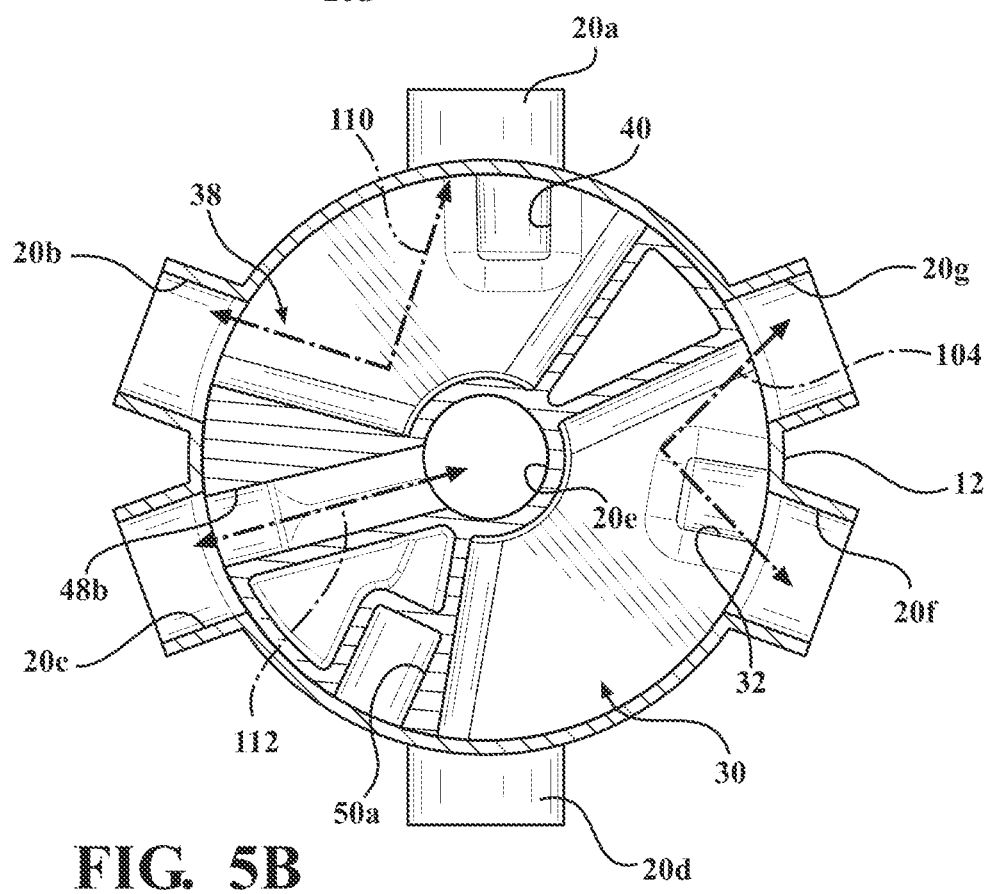
FIG. 5B is a second sectional view of a first embodiment of a multi-port valve assembly, with the rotor in a fourth configuration, according to embodiments of the present invention.

The rotor 16 is in a fourth configuration in FIGS. 5A and 5B. The fourth configuration also includes the third flow path 104. However, when the rotor 16 is in the fourth configuration, the port 20a is in fluid communication with the port 20b through the second arcuate channel 38 and the second recess portion 40, creating a sixth flow path 110, and the port 20c is in fluid communication with the port 20e through the first side channel 48, creating a seventh flow path 112. In the fourth configuration, the sixth flow path 110 includes flow between the first level 22 and the second level 24 through the second arcuate channel 38 and the second recess portion 40, and the seventh flow path 112 includes flow between the first level 22 and the second level 24 through the first shallow recess portion 48a and the first elongated channel 48b. There is no fluid that flows through the side channels 50,52 or the port 20d.

Figure 6A:
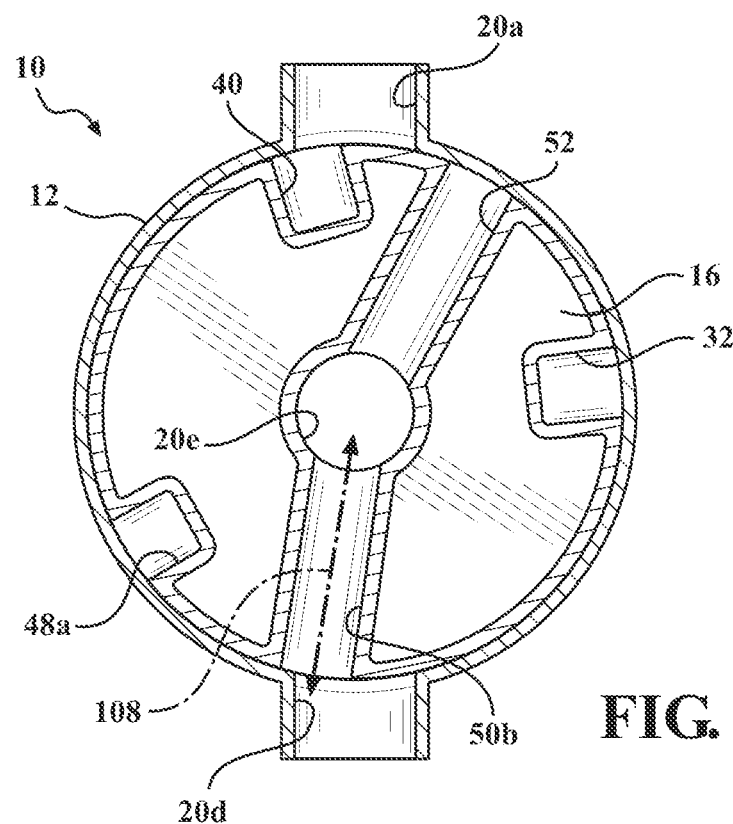
FIG. 6A is a first sectional view of a first embodiment of a multi-port valve assembly, with the rotor in a fifth configuration, according to embodiments of the present invention.
Figure 6B:
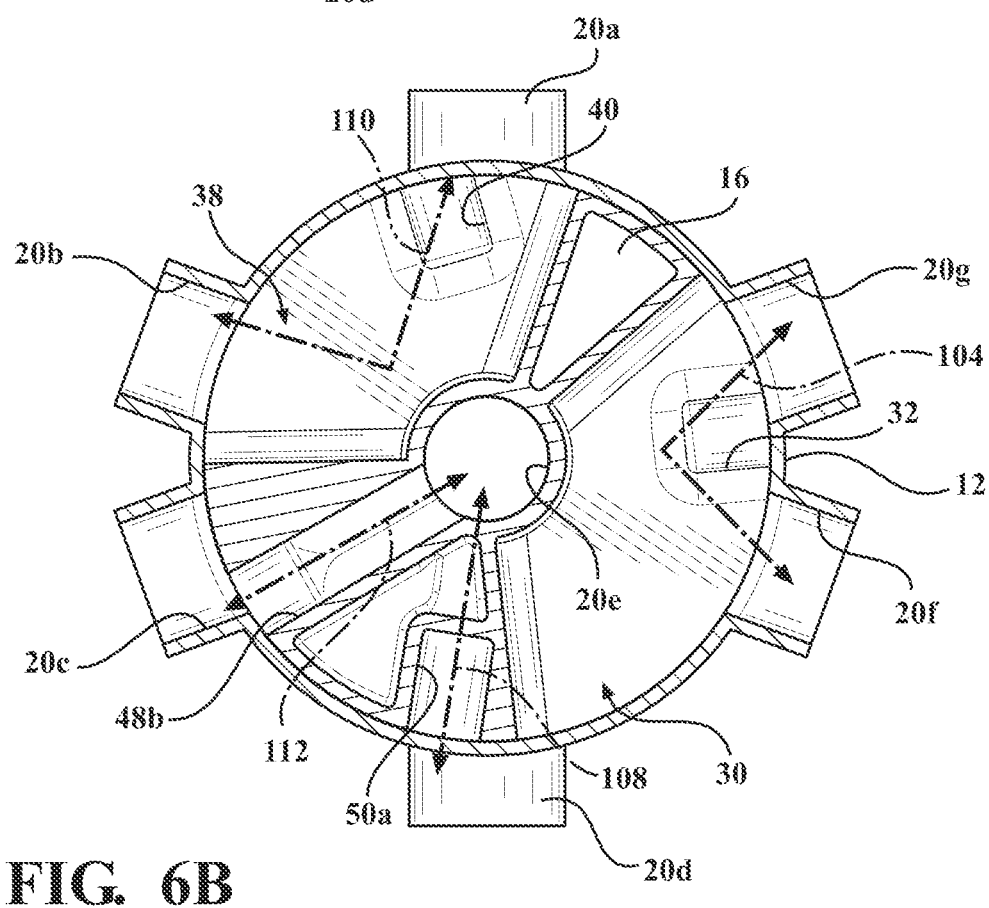
FIG. 6B is a second sectional view of a first embodiment of a multi-port valve assembly, with the rotor in a fifth configuration, according to embodiments of the present invention.

Referring to FIGS. 6A and 6B, the rotor 16 is placed in a fifth configuration. The fifth configuration includes the third flow path 104, the fifth flow path 108, the sixth flow path 110, and the seventh flow path 112. There is no fluid that flows through the third side channel 52.

Figure 7A:
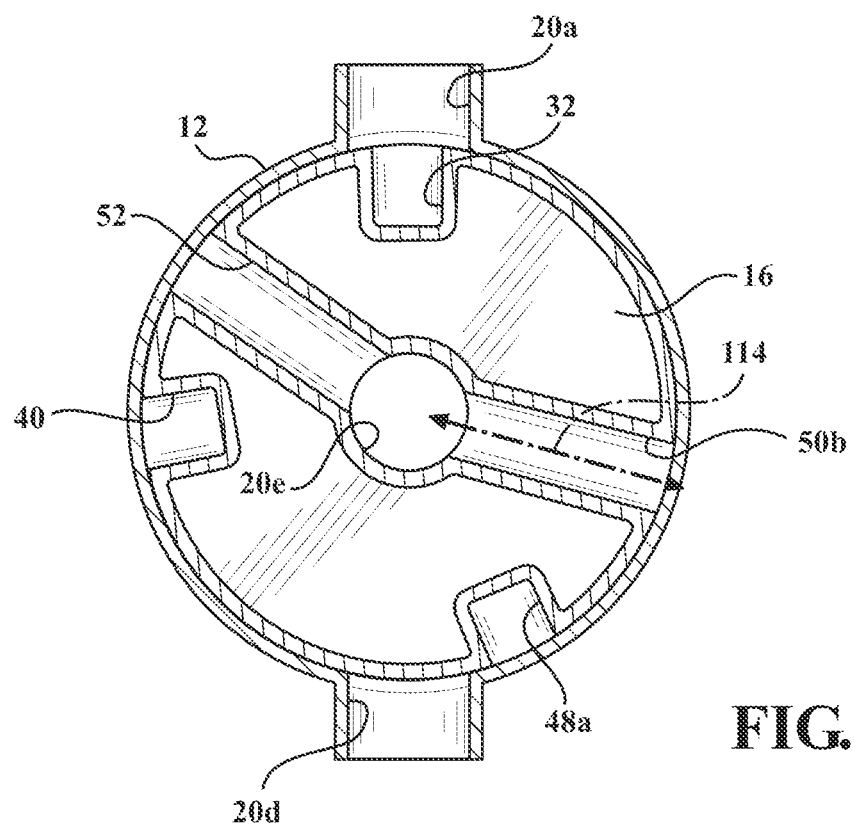
FIG. 7A is a first sectional view of a first embodiment of a multi-port valve assembly, with the rotor in a sixth configuration, according to embodiments of the present invention.
Figure 7B:
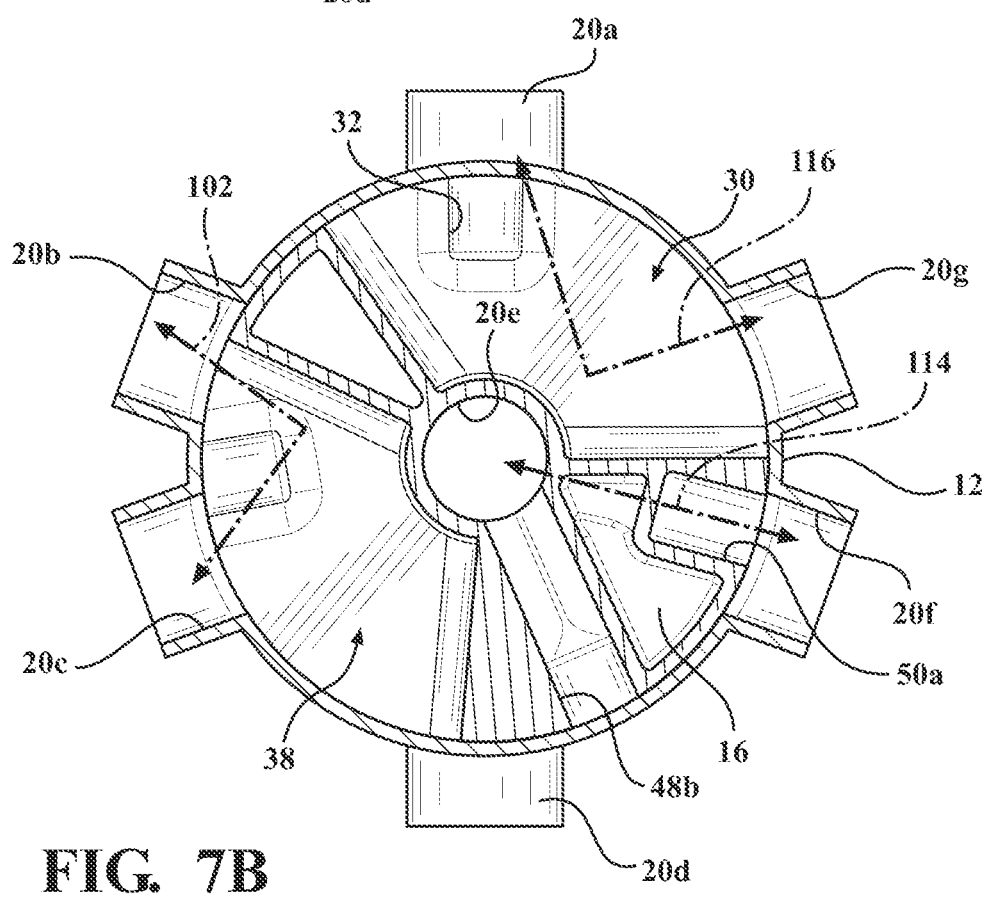
FIG. 7B is a second sectional view of a first embodiment of a multi-port valve assembly, with the rotor in a sixth configuration, according to embodiments of the present invention.

Referring now to FIGS. 7A and 7B, the rotor 16 is placed in a sixth configuration, which includes the second flow path 102. When the rotor 16 is in the sixth configuration the port 20e is in fluid communication with the port 20f through the second side channel 50, creating an eighth flow path 114, and the port 20a is in fluid communication with the port 20g through the first arcuate channel 30, creating a ninth flow path 116. In the sixth configuration, the eighth flow path 114 includes flow between the first level 22 and the second level 24 through the second shallow recess portion 50a and the second elongated channel 50b, and the ninth flow path 116 includes flow between the first level 22 and the second level 24 through the first arcuate channel 30 and the first recess portion 32. When the rotor 16 is in the sixth configuration, there is no fluid flow through the side channels 48,52, or the port 20d.

Another embodiment of the coolant flow control valve assembly 10 is shown in FIGS. 8A-14B, with like numbers referring to like elements. Referring to FIGS. 8A-8M, the housing 12 in this embodiment also includes several ports 20a,20b,20c,20d,20e,20f,20g where the ports 20a,20b,20c, 20d,20e,20f,20g are configured differently compared to the previous embodiment. In this embodiment, the ports 20a, 20c,20d,20e,20f are on the first level 22, and the ports 20b,20g, are on the second level 24. However, in this embodiment, the rotor 16 includes a first scallop channel, shown generally at 56, having a wide recessed portion, shown generally at 56a, and a narrow recess portion, shown generally at 56b. A portion of the wide recessed portion 56a is located on the first level 22, another portion of the wide recessed portion 56a is located on the second level 24, and the narrow recessed portion 56b is located on the second level 24, such that when the rotor 16 is placed in one of a plurality of configurations, the fluid is able to flow between the first level 22 and the second level 24. The first scallop channel 56 includes an inner wall 66a, and two outer walls 66b,66c adjacent the inner wall 66a. The second outer wall 66c is also part of the narrow recess portion 56b. The first scallop channel 56 also includes vertical outer walls 66d, 66e, each of which extend between the two levels 22,24. The vertical outer wall 66d is adjacent the inner wall 66a, extends from the outer wall 66b and terminates at the narrow recess portion 56b, and the vertical outer wall 66e is also adjacent the inner wall 66a and extends from the outer wall 66b to the other outer wall 66c.

The rotor 16 in this embodiment also includes a second scallop channel, shown generally at 58, which includes a wide recessed portion, shown generally at 58a, and a narrow recessed portion, shown generally at 58b. A portion of the wide recessed portion 58a is located on the first level 22, and another portion of the wide recessed portion 58a is located on the second level 24, and the narrow recessed portion 58b is located on the second level 24, such that when the rotor 16 is placed in one of a plurality of configurations, the fluid is able to flow between the first level 22 and the second level 24.

The second scallop channel 58 includes an inner wall 68a, and two outer walls 68b,68c integrally formed with the inner wall 68a. The second outer wall 68c is also part of the narrow recess portion 58b. The second scallop channel 58 also includes vertical outer walls 68d,68e, each of which extend between the two levels 22,24. The vertical outer wall 68d is adjacent the inner wall 68a, extends from the outer wall 68b and terminates at the narrow recess portion 58b, and the vertical outer wall 68e is also adjacent the inner wall 68a and extends from the outer wall 68b to the other outer wall 68c.

The rotor 16 in this embodiment also includes a first side channel 60, a second side channel 62, and a third side channel 64, all of which are in fluid communication with the central channel 54, and are therefore in fluid communication with one another. The side channels 60,62,64 are also located on the first level 22. The first side channel 60 and the second side channel 62 are on the opposite side of the rotor 16 in relation to the third side channel 64.

The first scallop channel 56 is fluidically isolated from the second scallop channel 58 and the side channels 60,62,64. The second scallop channel 58 is also fluidically isolated from the side channels 60,62,64.

The scallop channels 56,58 and the side channels 60,62, 64 are also shaped to facilitate flow between the various ports 20a,20b,20c,20d,20e,20f,20g. Various configurations of the rotor 16 relative to the housing 12 are shown in FIGS. 9A-14B, which achieve various flow configurations.

Figure 8A:
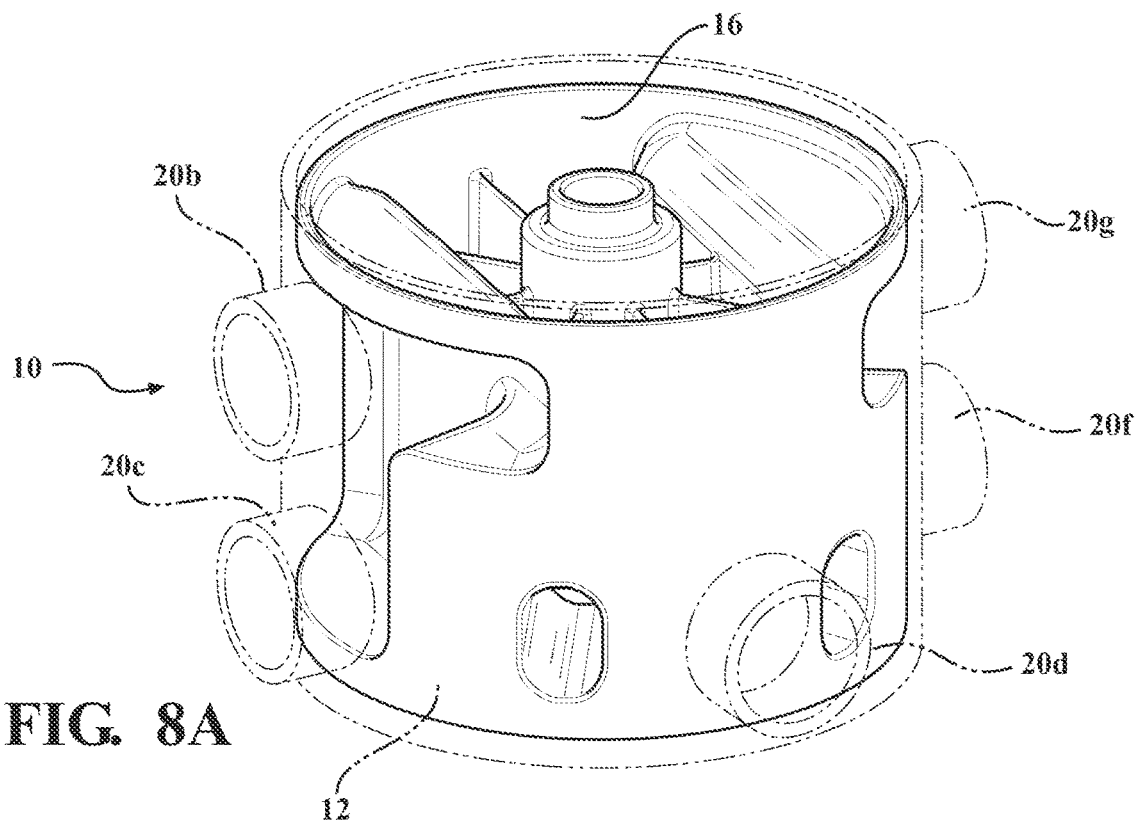
FIG. 8A is a first perspective view of a second embodiment of a multi-port valve assembly, according to embodiments of the present invention.
Figure 8B:
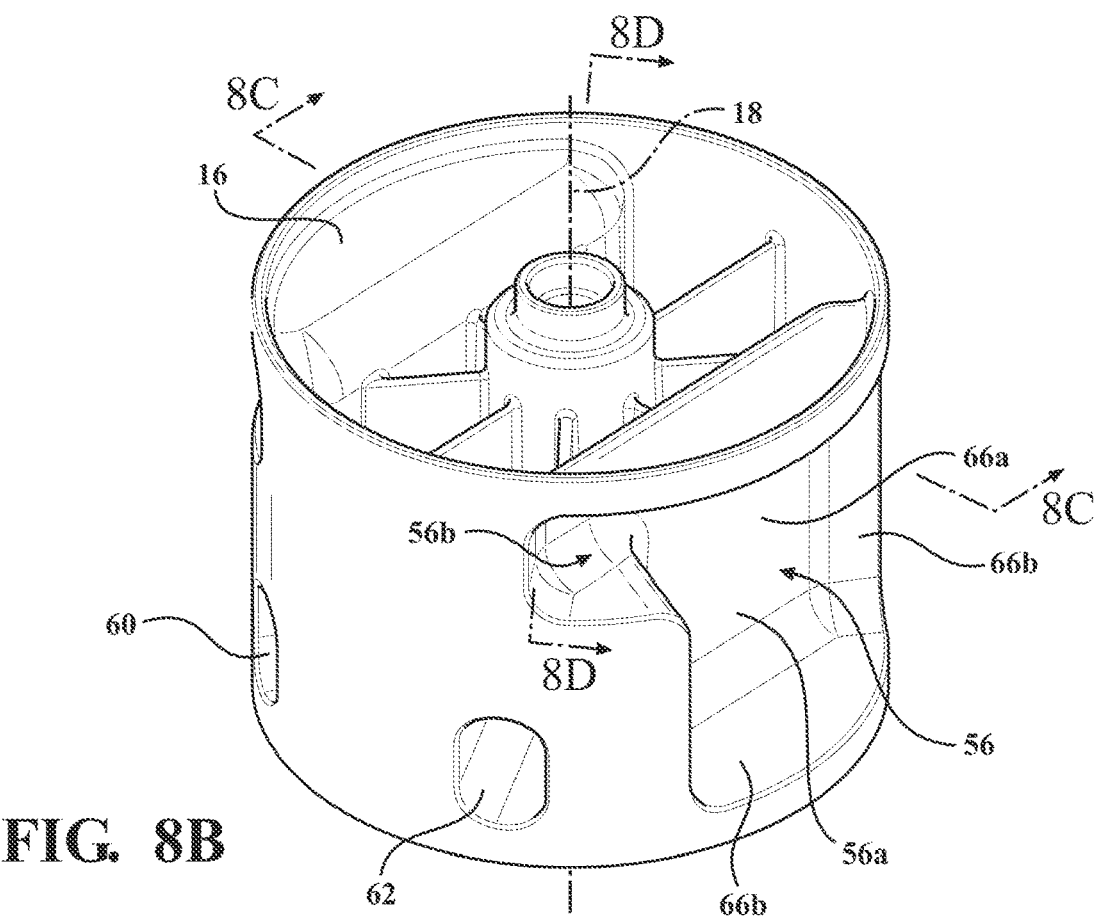
FIG. 8B a first perspective view of a rotor used as part of a second embodiment of a multi-port valve assembly, according to embodiments of the present invention.
Figure 8C:
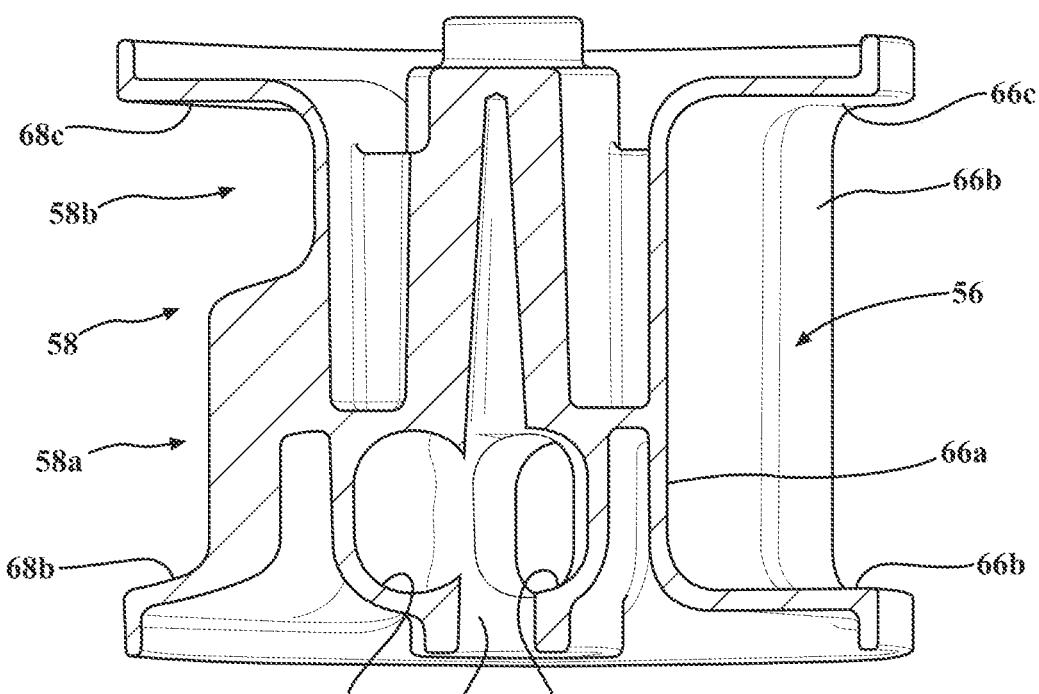
FIG. 8C is a sectional view of the rotor taken along lines 8C-8C in FIG. 8B.
Figure 8D:
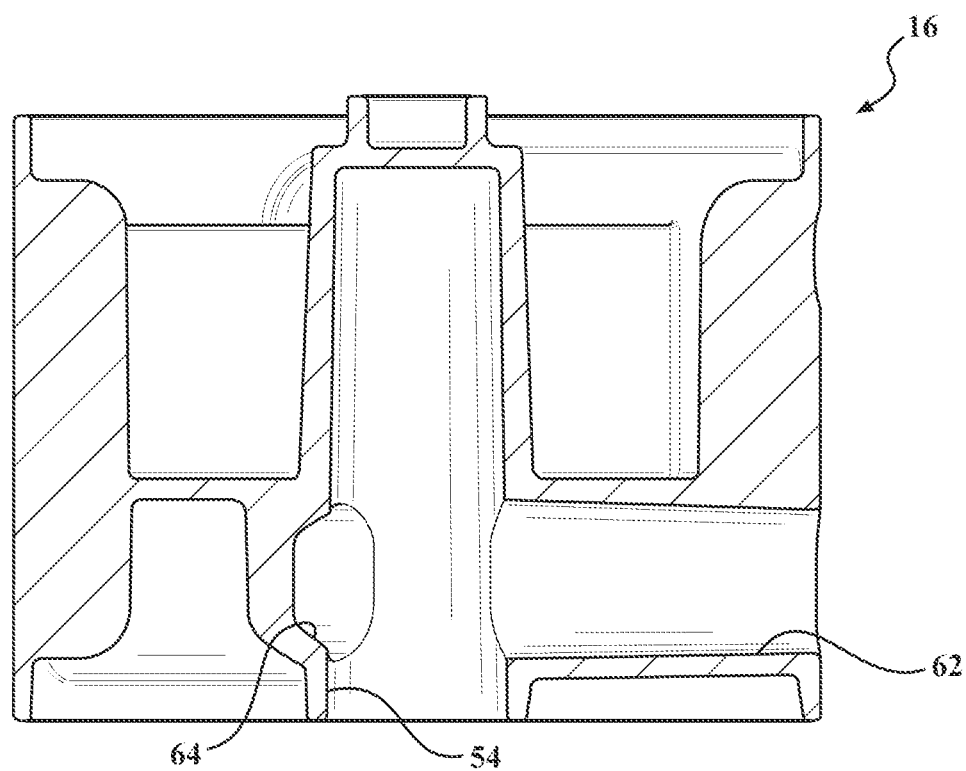
FIG. 8D is a sectional view of the rotor taken along lines 8D-8D in FIG. 8B.
Figure 8E:
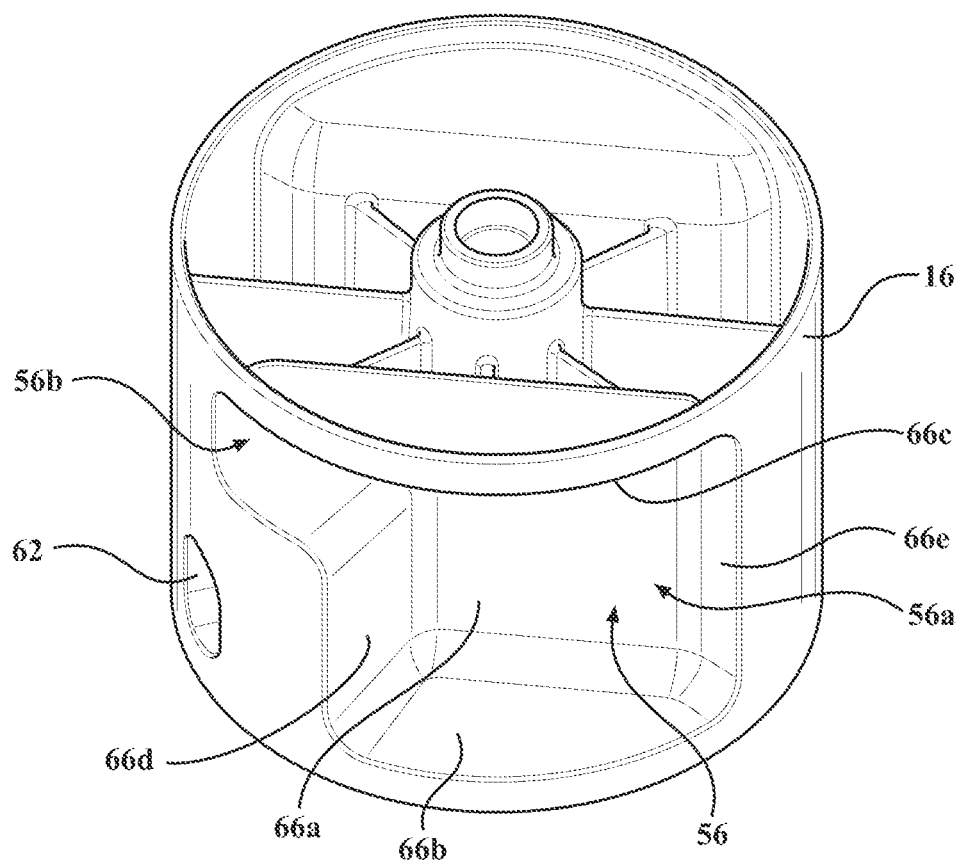
FIG. 8E is a second perspective view of a rotor used as part of a second embodiment of a multi-port valve assembly, according to embodiments of the present invention.
Figure 8F:
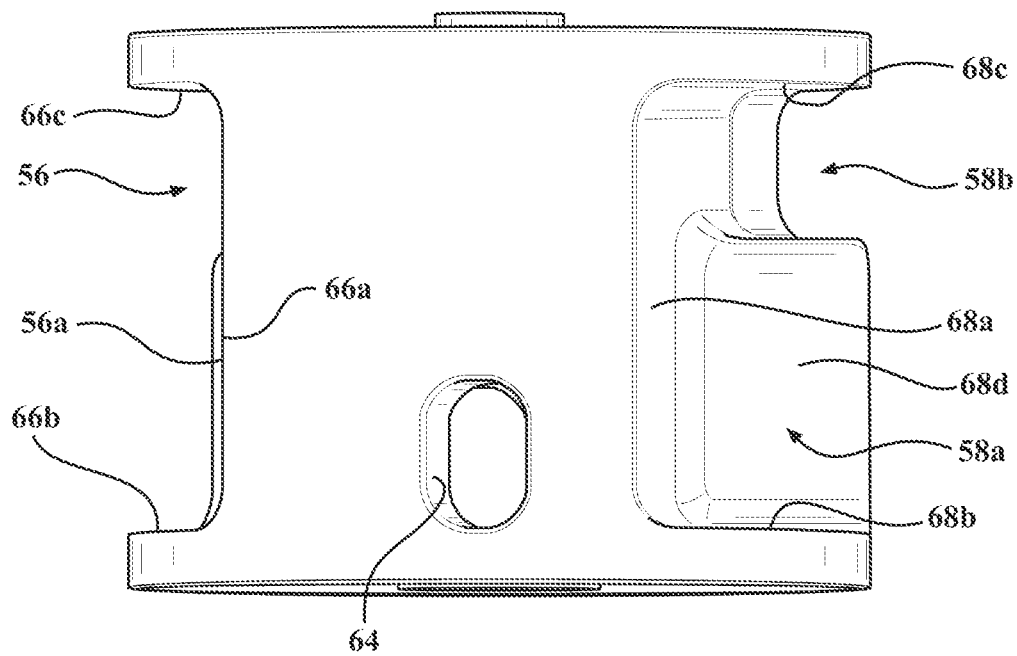
FIG. 8F is a third perspective view of a rotor used as part of a second embodiment of a multi-port valve assembly, according to embodiments of the present invention.
Figure 8G:
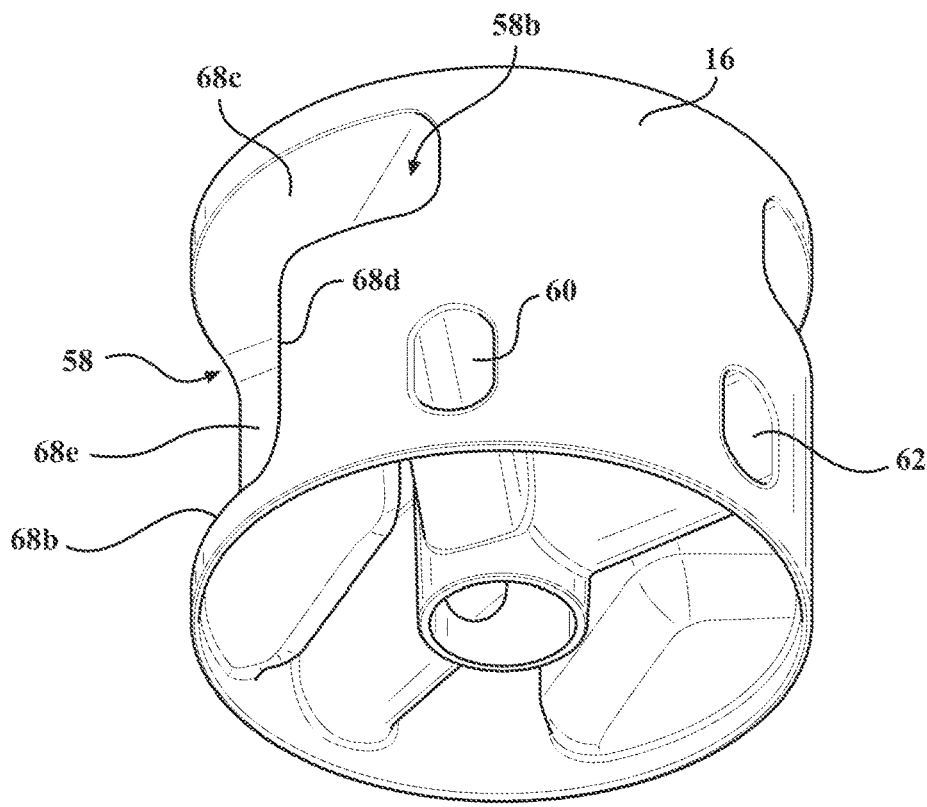
FIG. 8G a fourth perspective view of a rotor used as part of a second embodiment of a multi-port valve assembly, according to embodiments of the present invention.
Figure 8H:
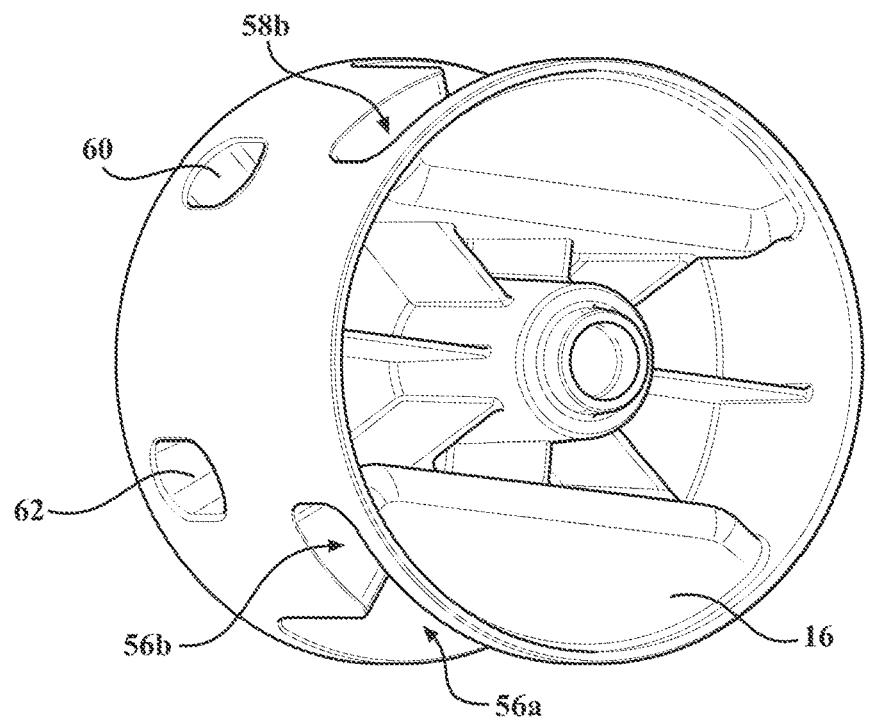
FIG. 8H a fifth perspective view of a rotor used as part of a second embodiment of a multi-port valve assembly, according to embodiments of the present invention.
Figure 8I:
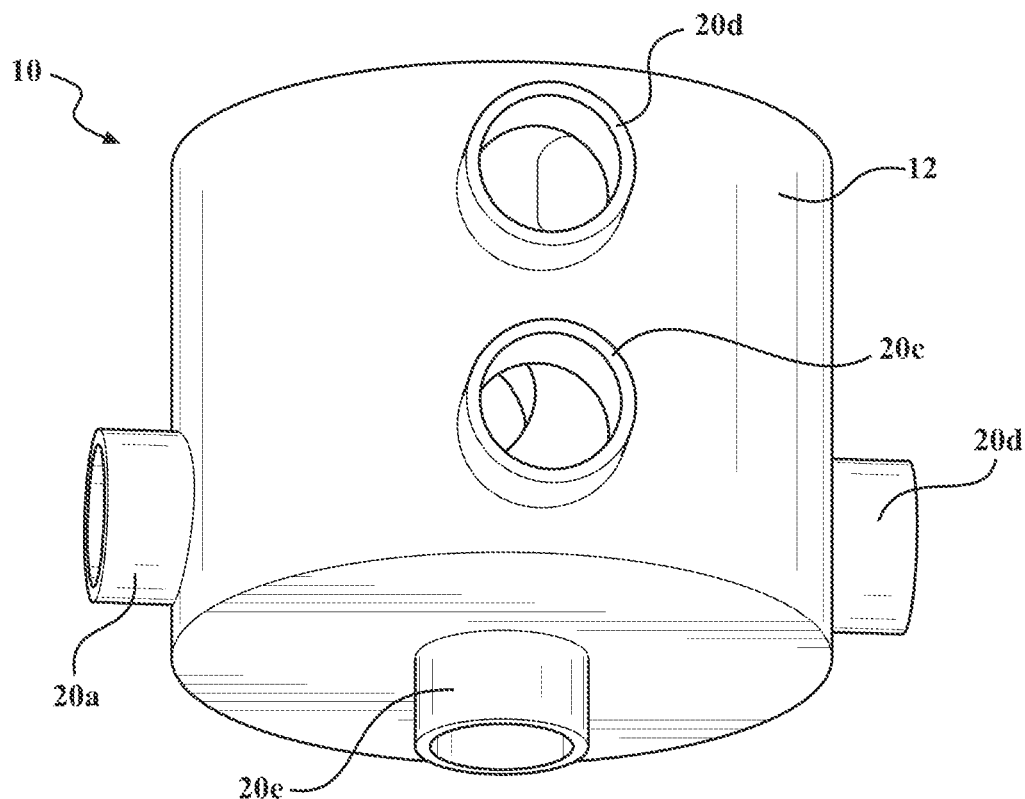
FIG. 8I is a second perspective view of a second embodiment of a multi-port valve assembly, according to embodiments of the present invention.
Figure 8J:
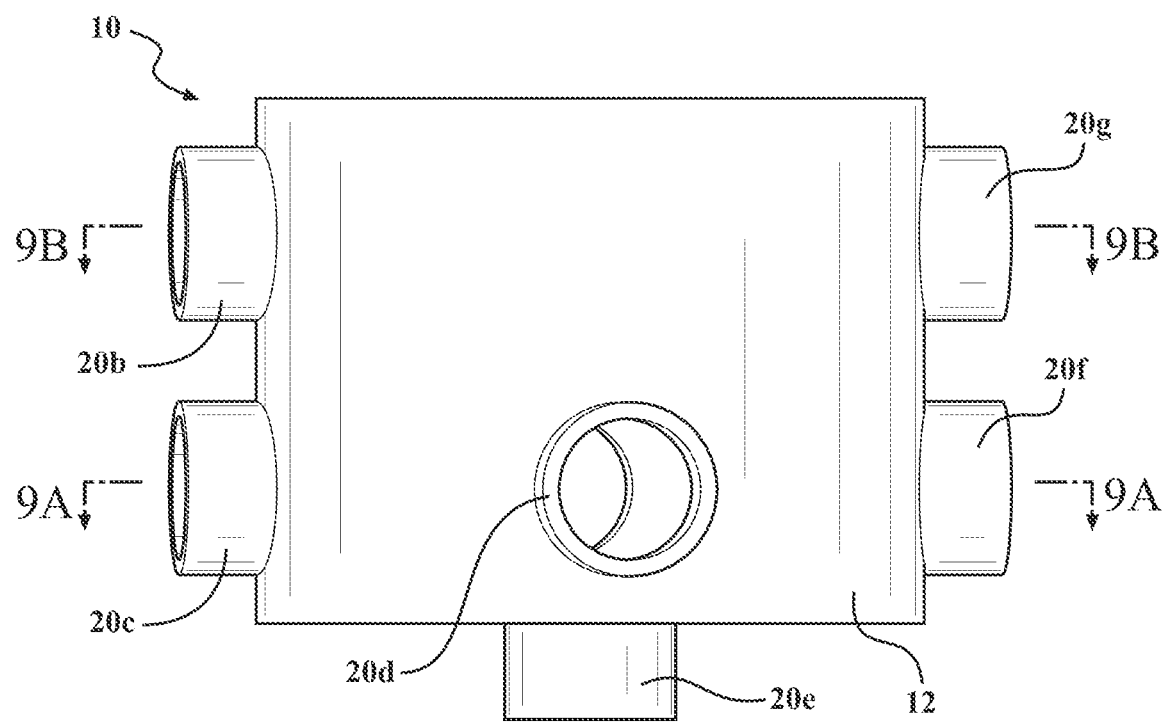
FIG. 8J is a third perspective view of a second embodiment of a multi-port valve assembly, according to embodiments of the present invention.
Figure 8K:
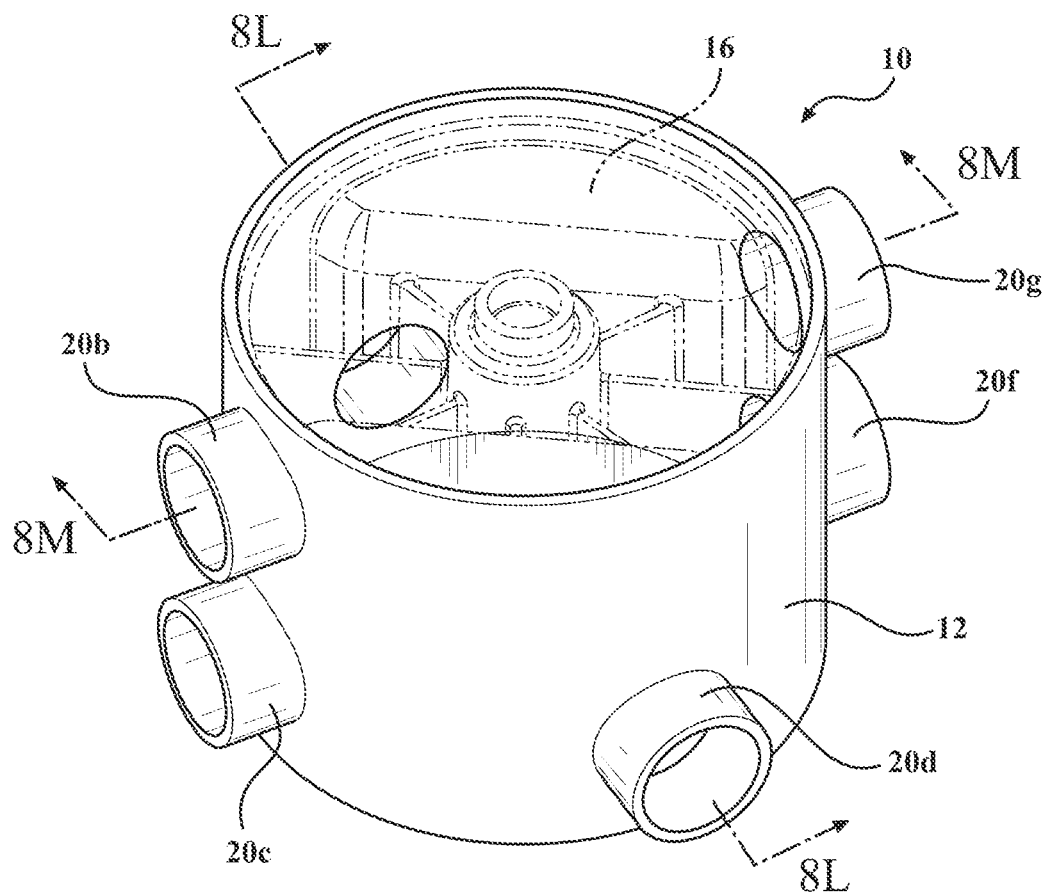
FIG. 8K is a fourth perspective view of a second embodiment of a multi-port valve assembly, according to embodiments of the present invention.
Figure 8L:
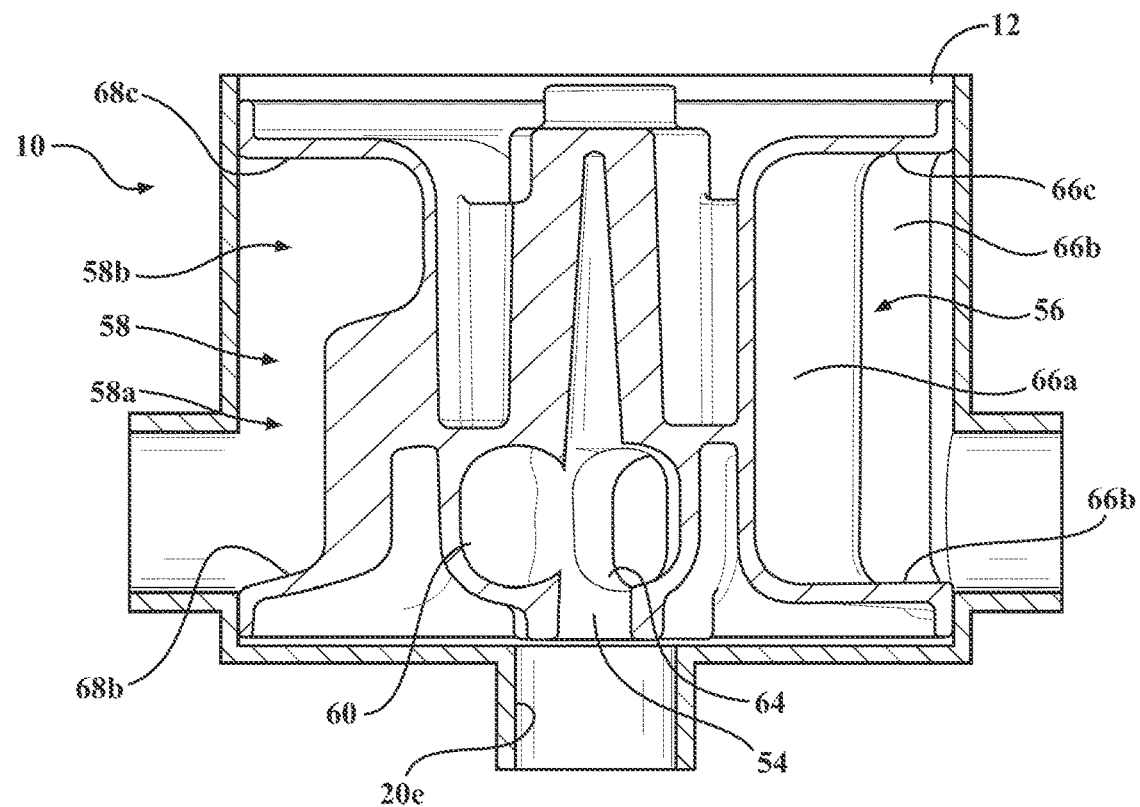
FIG. 8L is a sectional view taken along lines 8L-8L in FIG. 8K.
Figure 8M:
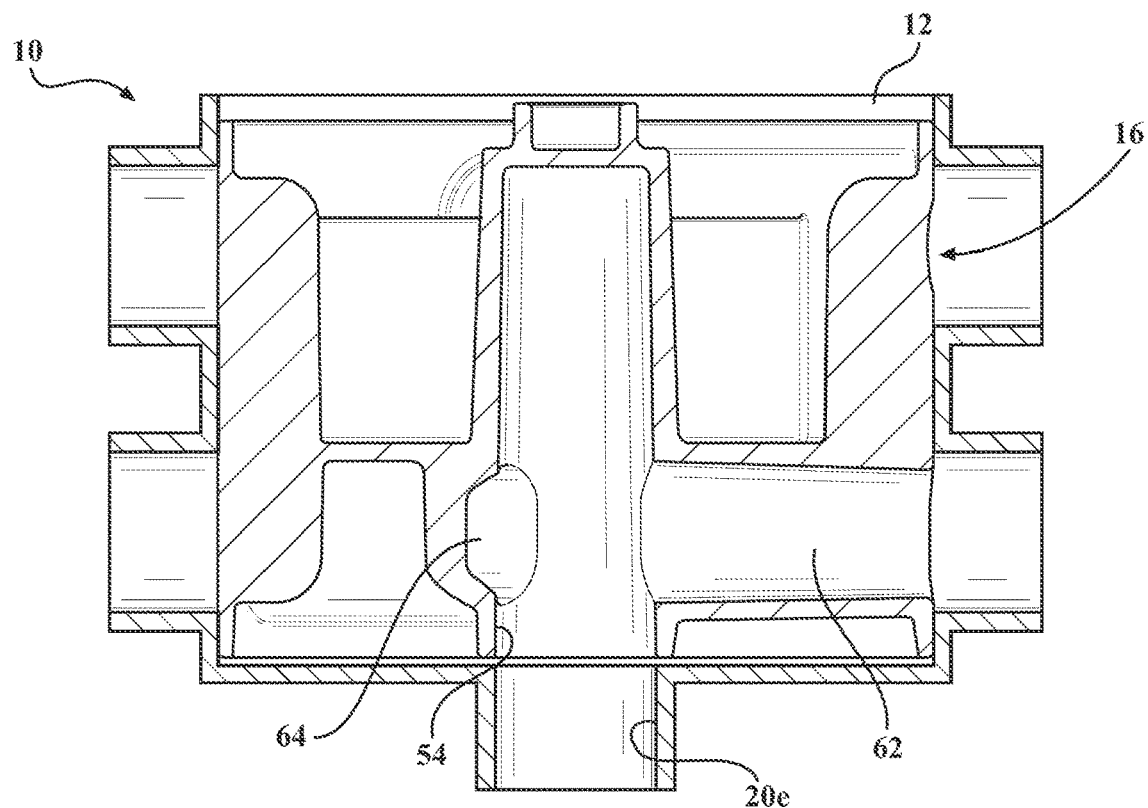
FIG. 8M is a sectional view taken along lines 8M-8M in FIG. 8K.
Figure 9A:
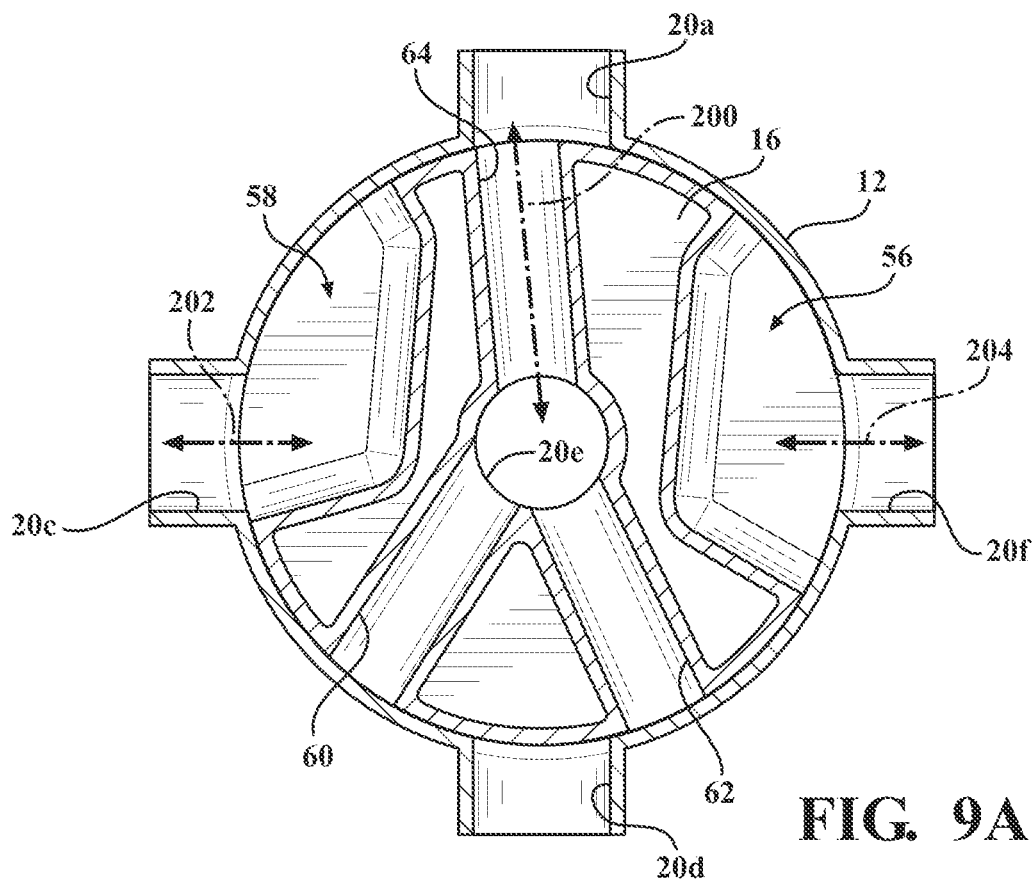
FIG. 9A is a first sectional view of a second embodiment of a multi-port valve assembly taken along lines 9A-9A in FIG. 8J, with the rotor in a first configuration, according to embodiments of the present invention.

Various configurations of the rotor 16 relative to the housing 12 are shown in FIGS. 9A-14B, which achieve various flow configurations. FIG. 9A is a sectional view taken along lines 9A-9A in FIG. 8J, and FIG. 9B is a sectional view taken along lines 9B-9B in FIG. 8J. FIGS. 10A-14B are similar sectional views, with rotor 16 in different configurations.

Figure 9B:
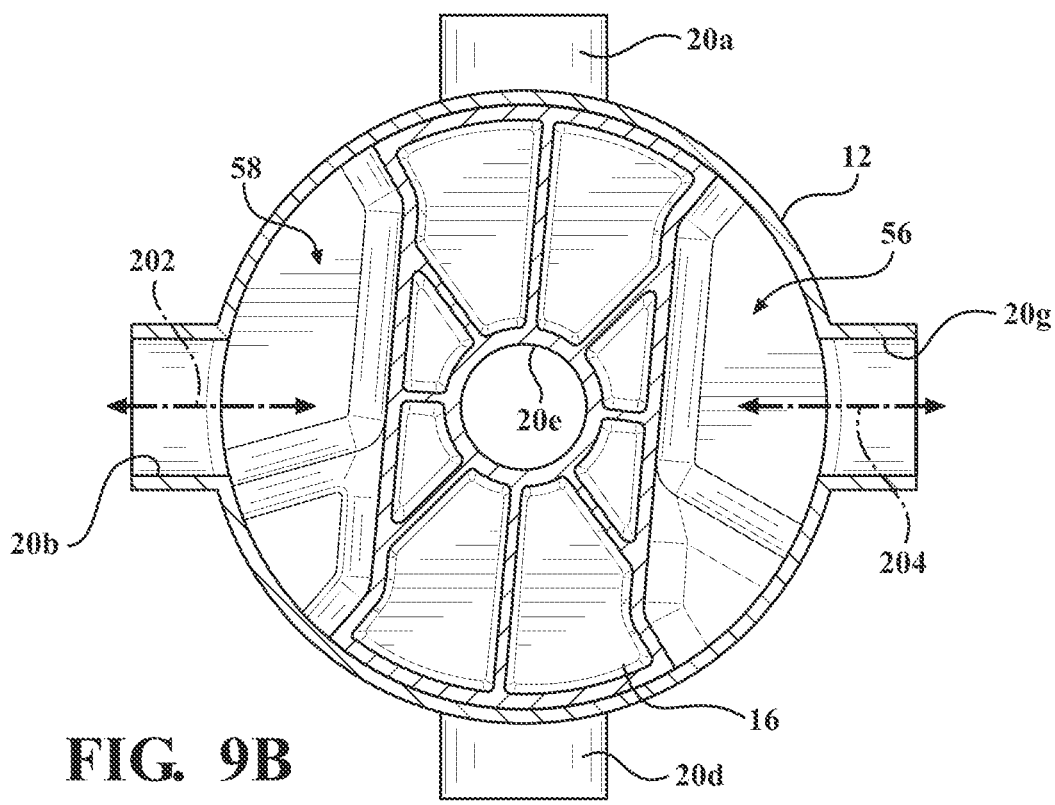
FIG. 9B is a second sectional view of a second embodiment of a multi-port valve assembly taken along lines 9B-9B in FIG. 8J, with the rotor in a first configuration, according to embodiments of the present invention.

Referring now to FIGS. 9A and 9B, the rotor 16 is placed in a first configuration, where port 20e is in fluid communication with port 20a through the third side channel 64 to create a tenth flow path 200. When the rotor 16 is in the first configuration, the port 20b is in fluid communication with the port 20c through the second scallop channel 58 to create an eleventh flow path 202, and the port 20f is in fluid communication with the port 20g through the first scallop channel 56 to create a twelfth flow path 204. In the first configuration, the eleventh flow path 202 includes flow between the first level 22 and the second level 24 through the second scallop channel 58 having the wide recessed portion 58a and the narrow recessed portion 58b, and the twelfth flow path 204 includes flow between the first level 22 and the second level 24 through the first scallop channel 56 having the wide recessed portion 56a and the narrow recess portion 56b. There is no fluid that passes through the side channels 60,62 or the port 20d.

Figure 10A:
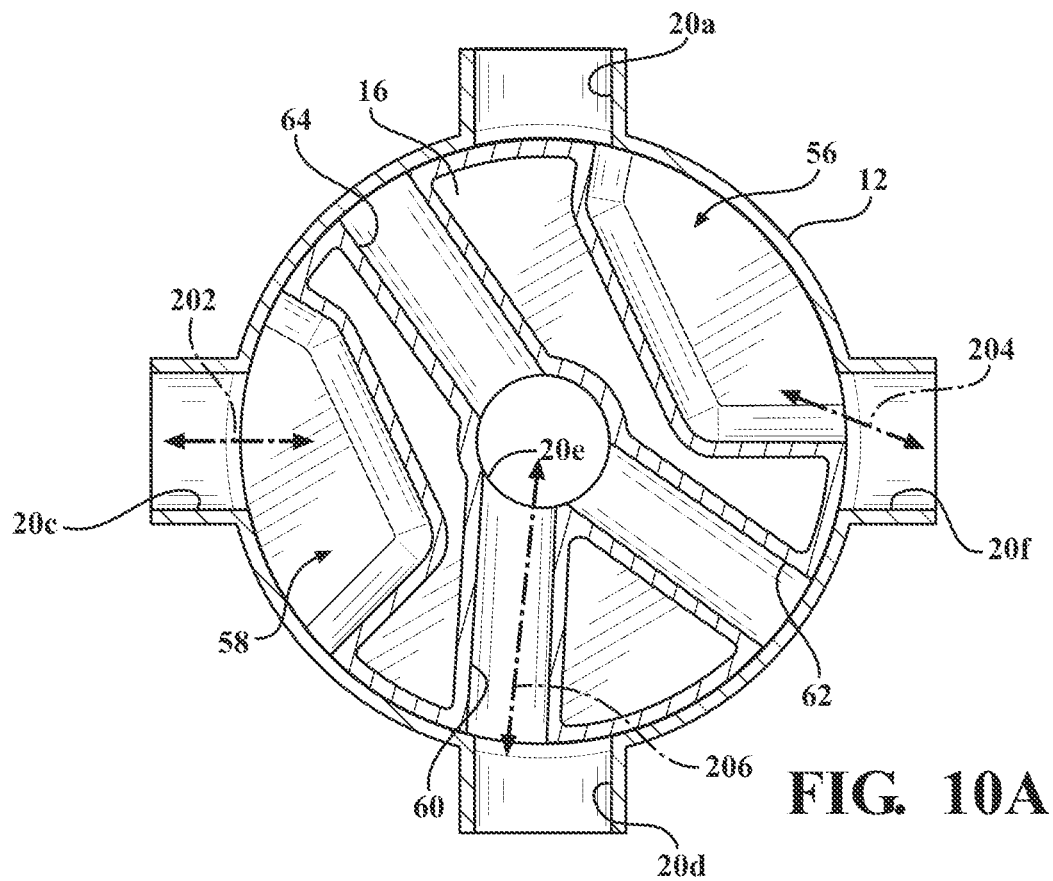
FIG. 10A is a first sectional view of a second embodiment of a multi-port valve assembly, with the rotor in a second configuration, according to embodiments of the present invention.
Figure 10B:
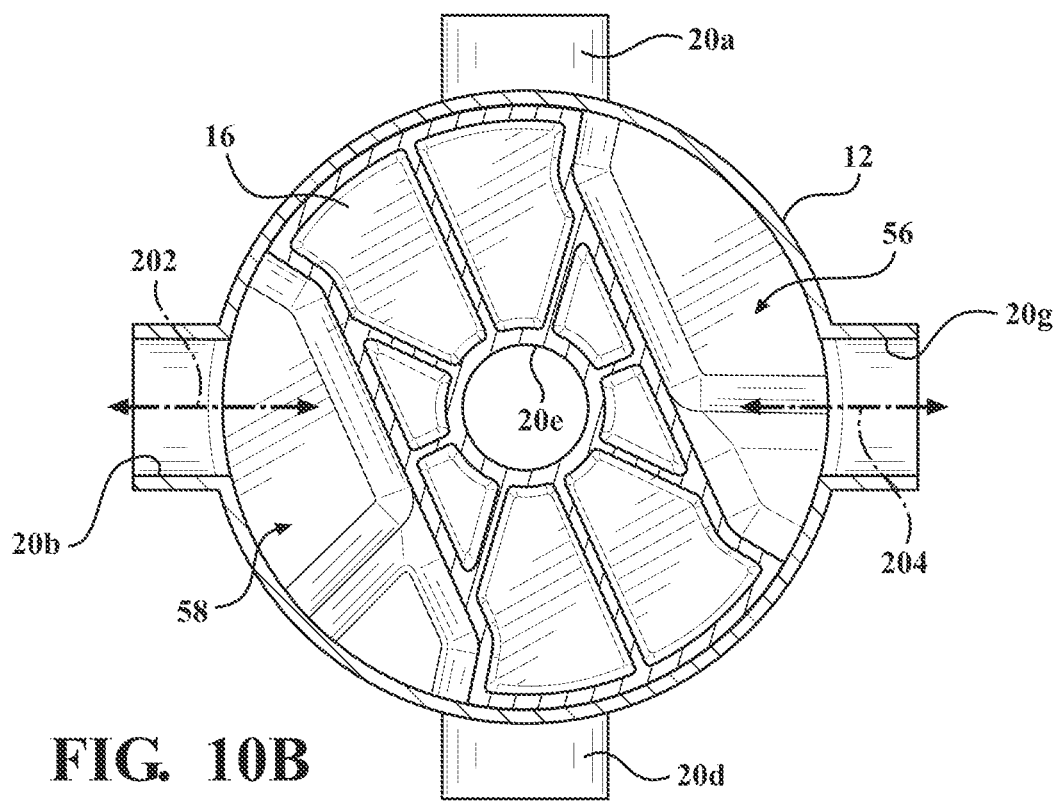
FIG. 10B is a second sectional view of a second embodiment of a multi-port valve assembly, with the rotor in a second configuration, according to embodiments of the present invention.

Referring to FIGS. 10A and 10B, the rotor 16 is placed in a second configuration, and the second configuration includes the eleventh flow path 202 and the twelfth flow path 204. When the rotor 16 is in the second configuration, the port 20d is in fluid communication with the port 20e through the first side channel 60, creating a thirteenth flow path 206. There is no fluid that passes through the side channels 62,64 or the port 20a.

Figure 11A:
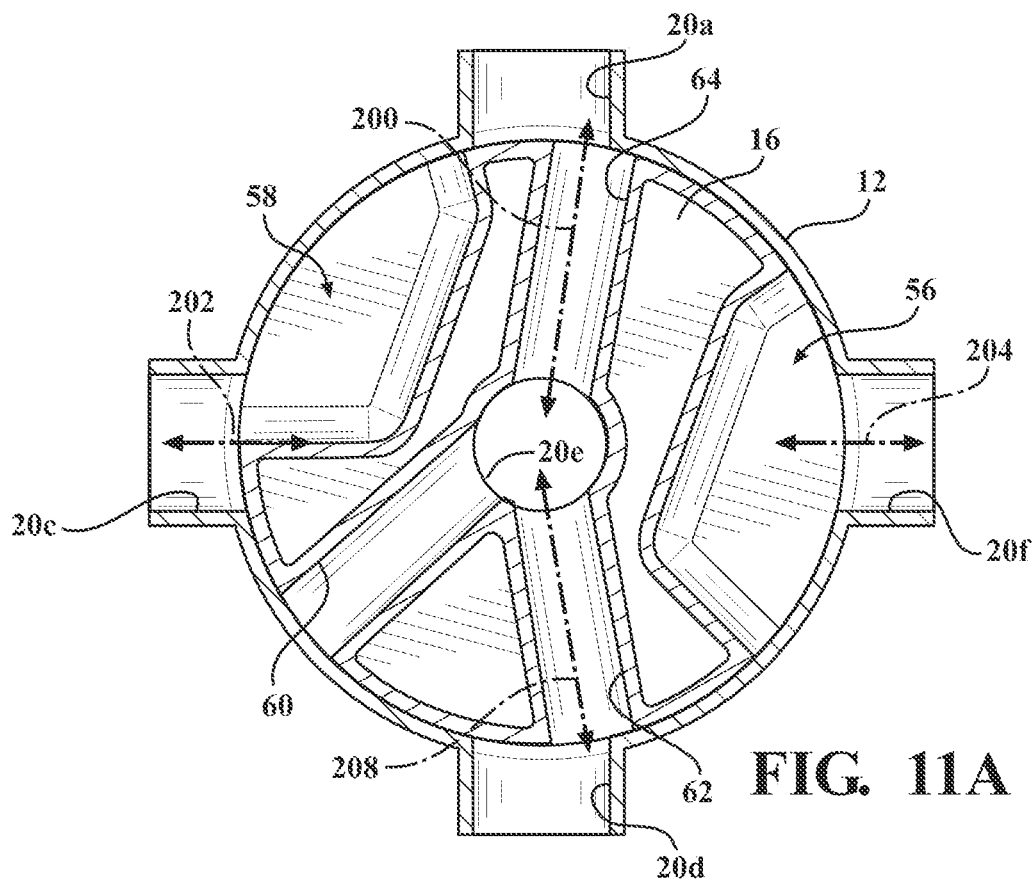
FIG. 11A is a first sectional view of a second embodiment of a multi-port valve assembly, with the rotor in a third configuration, according to embodiments of the present invention.
Figure 11B:
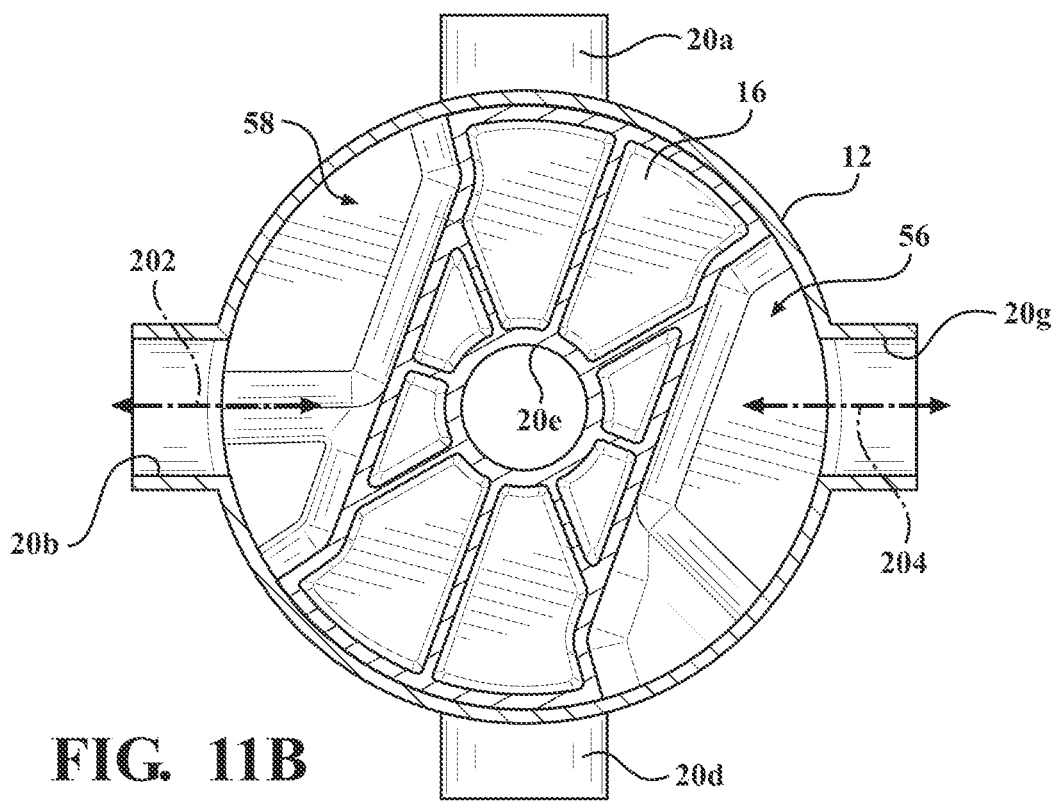
FIG. 11B is a second sectional view of a second embodiment of a multi-port valve assembly, with the rotor in a third configuration, according to embodiments of the present invention.

Referring to FIGS. 11A and 11B, the rotor 16 is placed in a third configuration, and the third configuration includes the tenth flow path 200, the eleventh flow path 202 and the twelfth flow path 204. When the rotor 16 is in the third configuration, the port 20e is also in fluid communication with the port 20d through the second side channel 62, creating fourteenth flow path 208. There is no fluid that passes through the first side channel 48 when the rotor 16 is in the third configuration.

Figure 12A:
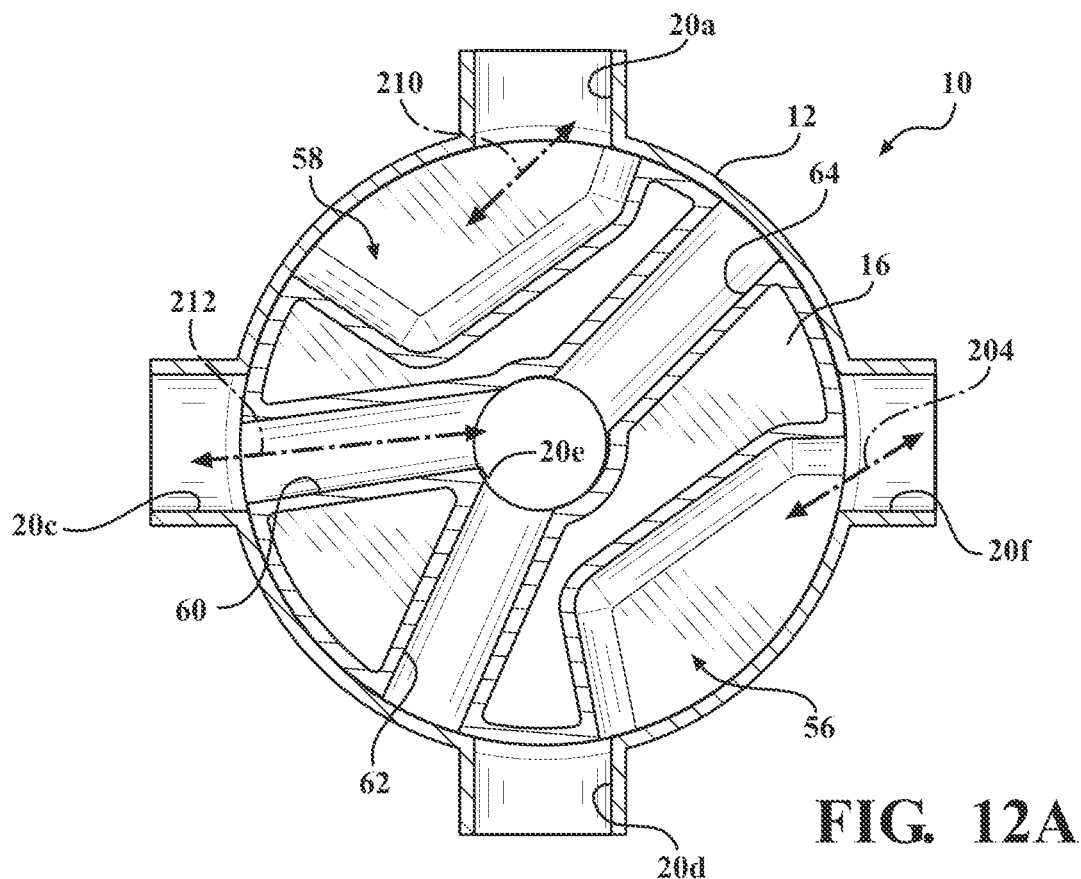
FIG. 12A is a first sectional view of a second embodiment of a multi-port valve assembly, with the rotor in a fourth configuration, according to embodiments of the present invention.
Figure 12B:
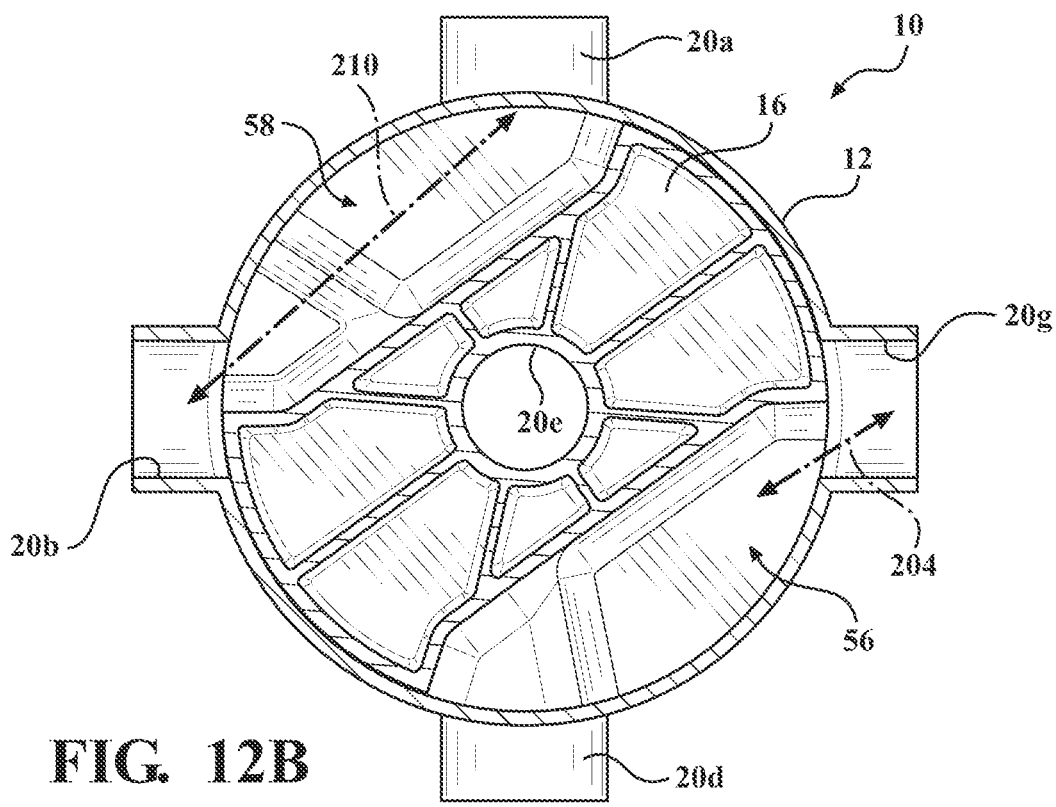
FIG. 12B is a second sectional view of a second embodiment of a multi-port valve assembly, with the rotor in a fourth configuration, according to embodiments of the present invention.

The rotor 16 is in a fourth configuration in FIGS. 12A and 12B. The fourth configuration also includes the twelfth flow path 204. However, when the rotor 16 is in the fourth configuration, the port 20a is in fluid communication with the port 20b through the second scallop channel 58, creating a fifteenth flow path 210, and the port 20c is in fluid communication with the port 20e through the first side channel 60, creating a sixteenth flow path 212. In the fourth configuration, the fifteenth flow path 210 includes flow between the first level 22 and the second level 24 through the second scallop channel 58 having the wide recessed portion 58a and the narrow recessed portion 58b. There is no fluid that flows through the side channels 62,64 or the port 20d.

Figure 13A:
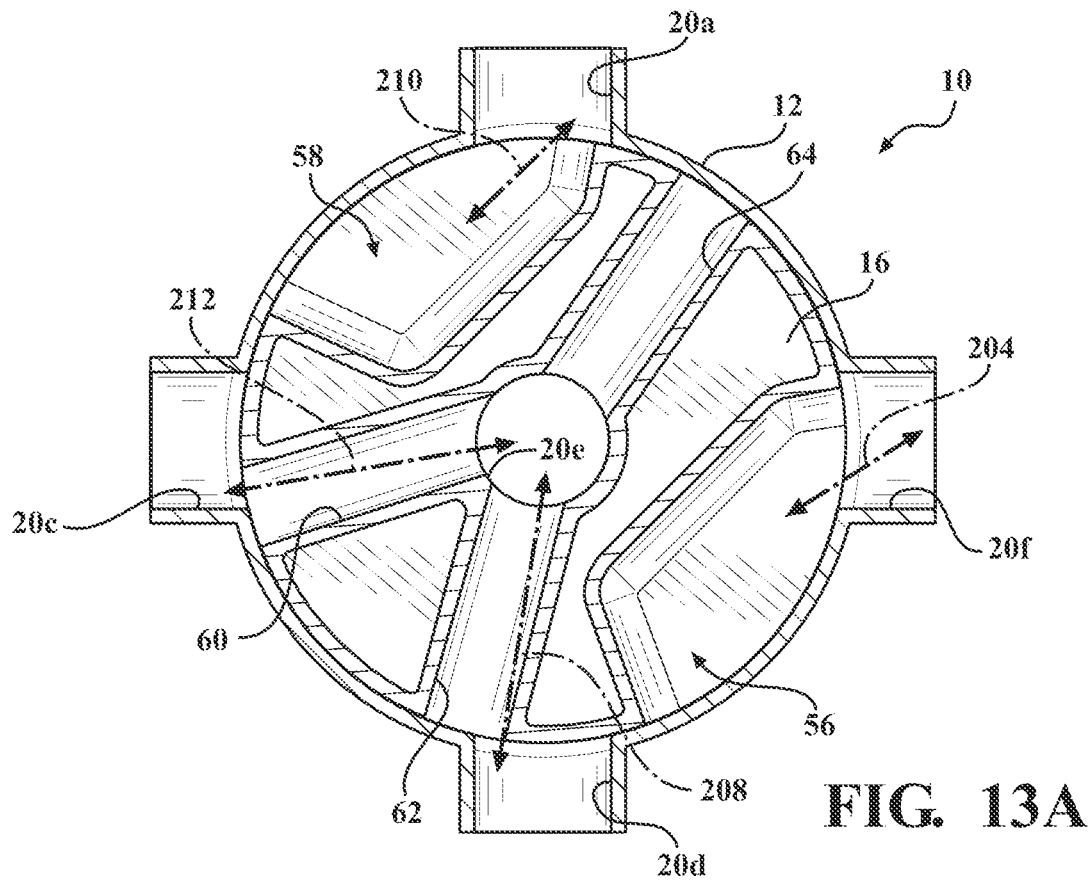
FIG. 13A is a first sectional view of a second embodiment of a multi-port valve assembly, with the rotor in a fifth configuration, according to embodiments of the present invention.
Figure 13B:
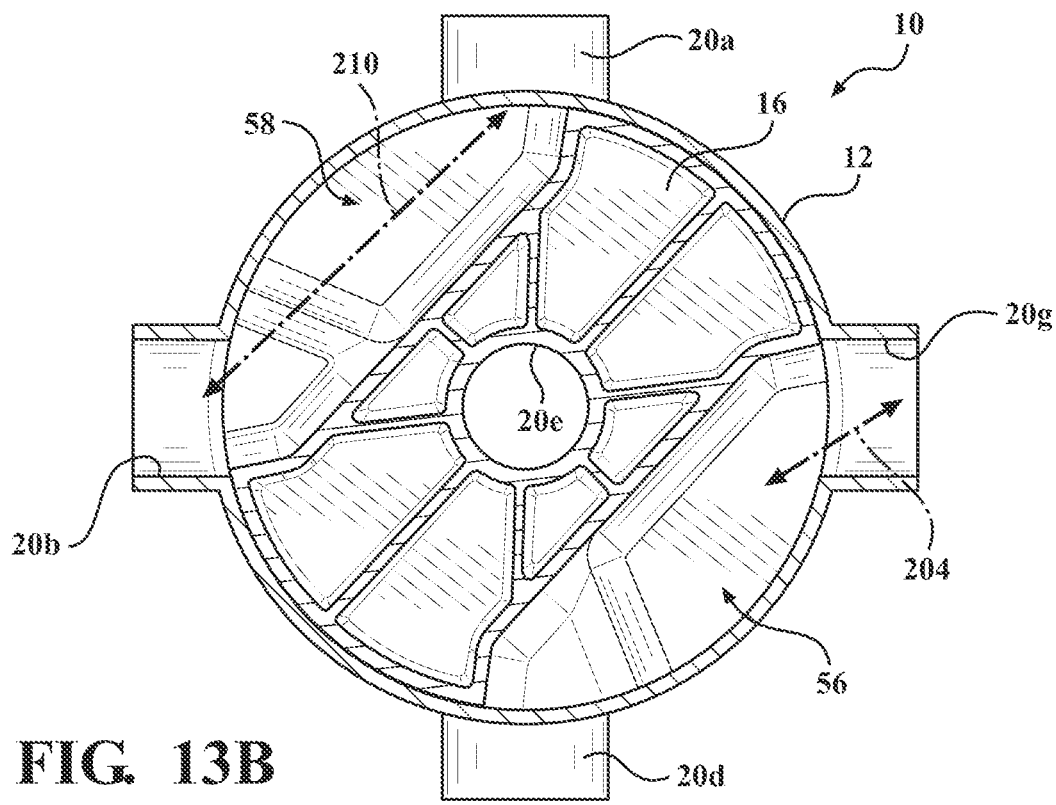
FIG. 13B is a second sectional view of a second embodiment of a multi-port valve assembly, with the rotor in a fifth configuration, according to embodiments of the present invention.

Referring to FIGS. 13A and 13B, the rotor 16 is placed in a fifth configuration. The fifth configuration includes the twelfth flow path 204, the fourteenth flow path 208, the fifteenth flow path 210, and the sixteenth flow path 212. There is no fluid that flows through the third side channel 64.

Figure 14A:
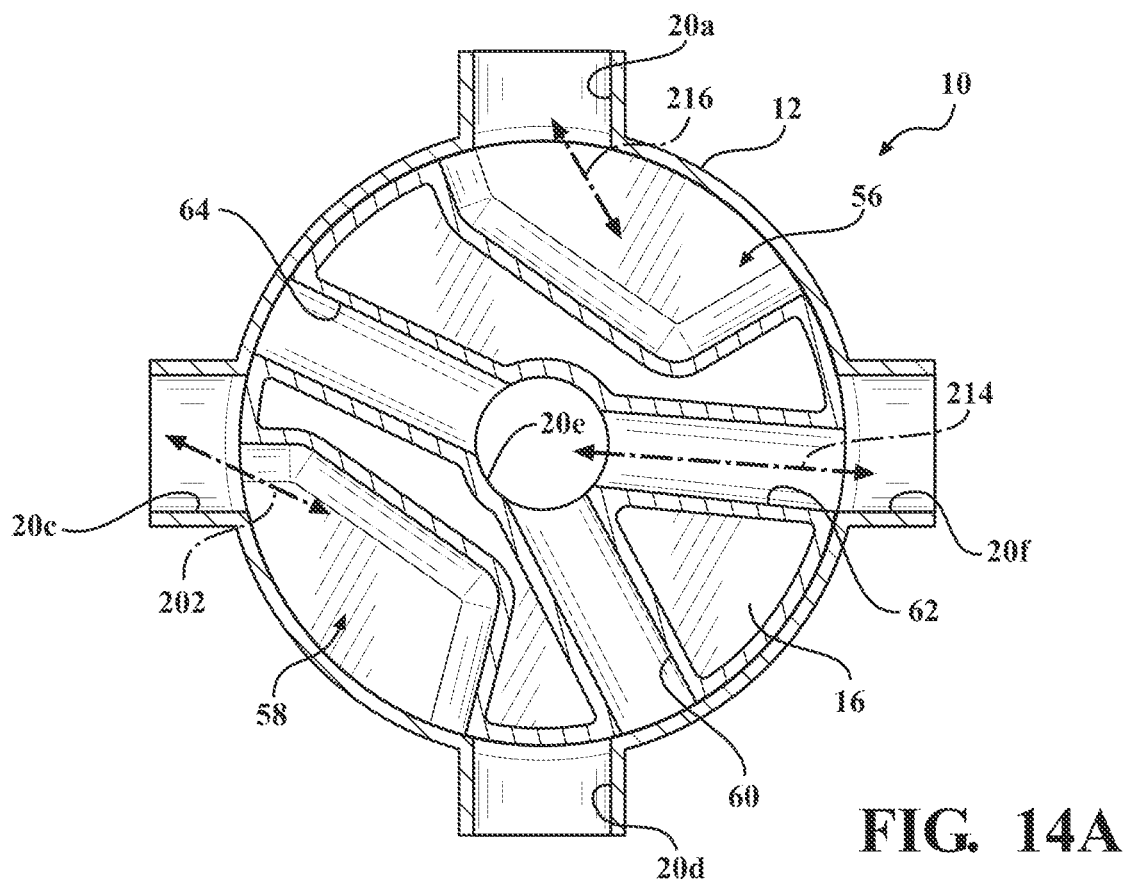
FIG. 14A is a first sectional view of a second embodiment of a multi-port valve assembly, with the rotor in a sixth configuration, according to embodiments of the present invention.
Figure 14B:
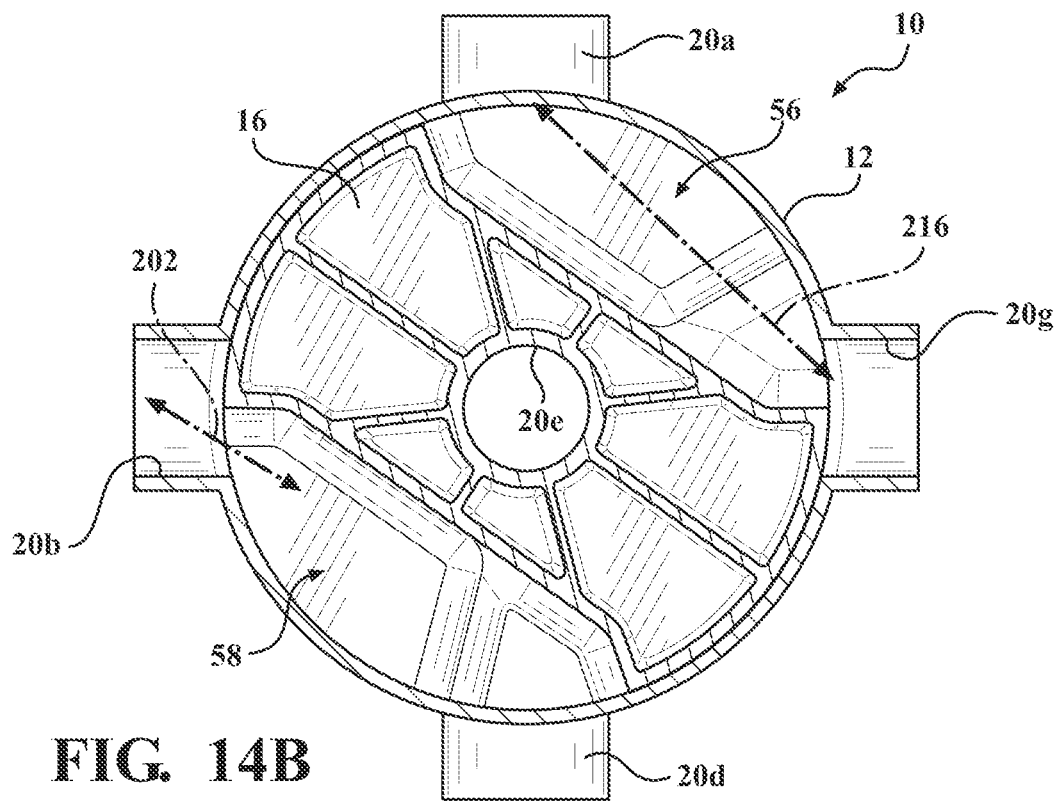
FIG. 14B is a second sectional view of a second embodiment of a multi-port valve assembly, with the rotor in a sixth configuration, according to embodiments of the present invention.

Referring now to FIGS. 14A and 14B, the rotor 16 is placed in a sixth configuration, which includes the eleventh flow path 202. When the rotor 16 is in the sixth configuration the port 20e is in fluid communication with the port 20f through the second side channel 62, creating a seventeenth flow path 214, and the port 20a is in fluid communication with the port 20g through the first scallop channel 56, creating an eighteenth flow path 216. In the sixth configuration, the eighteenth flow path 216 includes flow between the first level 22 and the second level 24 through the first scallop channel 56 having the wide recessed portion 56a and the narrow recess portion 56b. When the rotor 16 is in the sixth configuration, there is no fluid flow through the side channels 60,64 or the port 20d.

In both embodiments, it is within the scope of the invention that the rotor 16 in either embodiment may be placed in additional configurations to achieve other flows paths in addition to the ones already described.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a rotor for a multi-port valve assembly, the rotor including:
      a plurality of channels, further comprising:
         a central channel, a portion of the central channel located on the first level, and a portion of the central channel located on the second level;
         at least one side channel in fluid communication with the central channel;
         at least one arcuate channel integrally formed as part of the rotor, a portion of the at least one arcuate channel located on the first level, and a portion of the at least one arcuate channel located on the second level;
      a central plane extending through the rotor;
      a first level on one side of the central plane, a portion of the plurality of channels integrally formed as a part of the rotor which is located on the first level;
      a second level on the opposite side of the central plane in relation to the first level, a portion of the plurality of channels integrally formed as a part of the rotor which is located on the second level; and
      at least two flow paths;
      wherein at least two of the plurality of channels directs the flow of fluid to create the at least two flow paths, and the rotor is rotated relative to the housing such that one of the at least two flow paths includes the at least one arcuate channel or the at least one side channel.

2. The apparatus of claim 1, wherein the at least one arcuate channel is fluidically isolated from the at least one side channel.

3. The apparatus of claim 1, the at least one side channel further comprising:
   a shallow recess portion; and
   an elongated channel integrally formed with and in fluid communication with the shallow recess portion;

wherein the elongated channel is in fluid communication with the central channel.

4. The apparatus of claim 3, wherein the shallow recess portion is located on the first level, and the elongated channel is located on the second level.

5. The apparatus of claim 3, wherein the shallow recess portion is located on the second level, and the elongated channel is located on the first level.

6. The apparatus of claim 1, wherein at least one of the at least two flow paths facilitates flow between the first level and the second level.

7. An apparatus, comprising:
a rotor for a multi-port valve assembly, the rotor further comprising:
a plurality of channels, further comprising:
a central channel, a portion of the central channel located on the first level, and a portion of the central channel located on the second level;
at least one side channel in fluid communication with the central channel;
at least one scallop channel integrally formed as part of the rotor, a portion of the at least one scallop channel located on the first level, and a portion of the at least one scallop channel located on the second level;
a central plane extending through the rotor;
a first level on one side of the central plane, a portion of the plurality of channels integrally formed as a part of the rotor which is located on the first level;
a second level on the opposite side of the central plane in relation to the first level, a portion of the plurality of channels integrally formed as a part of the rotor which is located on the second level;
at least two flow paths;
wherein at least two of the plurality of channels directs the flow of fluid to create the at least two flow paths, and the rotor is rotated relative to the housing such that one of the at least two flow paths includes the at least one scallop channel or the at least one side channel.

8. The apparatus of claim 7, wherein the at least one scallop channel is fluidically isolated from the at least one side channel.

9. The apparatus of claim 7, wherein a portion of the at least one scallop channel located on the first level, and a portion of the at least one scallop channel located on the second level.

10. A multi-port valve assembly, comprising:
a housing;
a plurality of ports, each of the plurality of ports formed as part of the housing;
a rotor disposed in the housing;
a plurality of channels integrally formed as part of the rotor, each of the plurality of channels selectively in fluid communication with one or more of the plurality of ports, the plurality of channels further comprising:
a first arcuate channel integrally formed as part of the rotor, a portion of the first arcuate channel located on the first level, and a portion of the first arcuate channel located on the second level;
a second arcuate channel integrally formed as part of the rotor, a portion of the second arcuate channel located on the first level, and a portion of the second arcuate channel located on the second level;
at least one side channel integrally formed as part of the rotor;
a central channel integrally formed as part of the rotor, the central channel in fluid communication with the at least one side channel;
a central plane extending through the rotor;
a first level on one side of the central plane, a portion of the plurality of channels integrally formed as a part of the rotor which is located on the first level;
a second level on the opposite side of the central plane in relation to the first level, a portion of the plurality of channels integrally formed as a part of the rotor which is located on the second level;
at least two flow paths formed by the orientation of the rotor relative to the housing and the plurality of ports;
wherein the rotor is placed in one of a plurality of configurations to achieve the at least two flow paths, and the rotor is rotated relative to the housing such that one of the at least two flow paths includes one of the first arcuate channel, the second arcuate channel, or the at least one side channel.

11. The multi-port valve assembly of claim 10, wherein the first arcuate channel is fluidically isolated from the second arcuate channel and the at least one side channel, and the second arcuate channel is fluidically isolated from the at least one side channel.

12. The multi-port valve assembly of claim 10, the at least one side channel further comprising:
a shallow recess portion; and
an elongated channel integrally formed with and in fluid communication with the shallow recess portion;
wherein the elongated channel is in fluid communication with the central channel.

13. The multi-port valve assembly of claim 12, wherein the shallow recess portion is located on the first level, and the elongated channel is located on the second level.

14. The multi-port valve assembly of claim 12, wherein the shallow recess portion is located on the second level, and the elongated channel is located on the first level.

15. The multi-port valve assembly of claim 10, wherein at least one of the at least two flow paths facilitates flow between the first level and the second level.

16. The multi-port valve assembly of claim 10, wherein a portion of the central channel located on the first level, and a portion of the central channel located on the second level.

17. A multi-port valve assembly, comprising:
a housing;
a plurality of ports, each of the plurality of ports formed as part of the housing;
a rotor disposed in the housing;
a plurality of channels integrally formed as part of the rotor, each of the plurality of channels selectively in fluid communication with one or more of the plurality of ports, the plurality of channels further comprising:
a first scallop channel integrally formed as part of the rotor, a portion of the first scallop channel located on the first level, and a portion of the first scallop channel located on the second level;
a second scallop channel integrally formed as part of the rotor, a portion of the second scallop channel located on the first level, and a portion of the second scallop channel located on the second level;
at least one side channel integrally formed as part of the rotor;
a central channel integrally formed as part of the rotor, the central channel in fluid communication with the at least one side channel;
a central plane extending through the rotor;

a first level on one side of the central plane, a portion of the plurality of channels integrally formed as a part of the rotor which is located on the first level;

a second level on the opposite side of the central plane in relation to the first level, a portion of the plurality of channels integrally formed as a part of the rotor which is located on the second level; and at least two flow paths formed by the orientation of the rotor relative to the housing and the plurality of ports;

wherein the rotor is placed in one of a plurality of configurations to achieve the at least two flow paths, the rotor is rotated relative to the housing such that one of the at least two flow paths includes one of the first scallop channel, the second scallop channel, or the at least one side channel.

18. The multi-port valve assembly of claim 17, wherein the first scallop channel is fluidically isolated from the second scallop channel and the at least one side channel, and the second scallop channel is also fluidically isolated from the at least one side channel.

19. The multi-port valve assembly of claim 17, wherein a portion of the central channel located on the first level, and a portion of the central channel located on the second level.

\* \* \* \* \*